(12) United States Patent
Skiver et al.

(10) Patent No.: US 6,329,925 B1
(45) Date of Patent: Dec. 11, 2001

(54) REARVIEW MIRROR ASSEMBLY WITH ADDED FEATURE MODULAR DISPLAY

(75) Inventors: Timothy G. Skiver; Joseph P. McCaw, both of Holland; John T. Uken, Grand Rapids; Jonathan E. DeLine, Holland, all of MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 09/448,700

(22) Filed: Nov. 24, 1999

(51) Int. Cl.[7] ............... G08B 5/00; G02B 5/08
(52) U.S. Cl. ............... 340/815.4; 340/815.73; 340/525; 340/425.5; 362/494; 359/604; 359/609; 359/872
(58) Field of Search ............... 340/815.4, 815.73, 340/525, 425.5; 362/494; 359/533, 548, 604, 606, 609, 844, 872, 873, 874, 875

(56) References Cited

U.S. PATENT DOCUMENTS

| | | | |
|---|---|---|---|
| D. 289,989 | 5/1987 | Skogler et al. | D12/188 |
| 2,414,223 | 1/1947 | De Virgilis | 240/4.2 |
| 3,004,473 | 10/1961 | Arthur et al. | 88/77 |
| 3,075,430 | 1/1963 | Woodward et al. | 88/77 |
| 3,152,216 | 10/1964 | Woodward | 88/77 |
| 3,467,465 | 9/1969 | Van Noord | 350/281 |
| 3,543,018 | 11/1970 | Barcus et al. | 240/4.2 |
| 3,870,404 | 3/1975 | Wilson et al. | 350/281 |
| 3,978,190 | 8/1976 | Kurz, Jr. et al. | 264/242 |
| 4,435,042 | 3/1984 | Wood et al. | 350/281 |
| 4,436,371 | 3/1984 | Wood et al. | 350/281 |
| 4,443,057 | 4/1984 | Bauer et al. | 350/281 |
| 4,588,267 | 5/1986 | Pastore | 350/600 |
| 4,646,210 | 2/1987 | Skogler et al. | 362/142 |
| 4,733,336 | 3/1988 | Skogler et al. | 362/142 |
| 4,807,096 | 2/1989 | Skogler et al. | 362/142 |
| 4,826,289 | 5/1989 | Vandenbrink et al. | 350/281 |
| 4,882,565 | 11/1989 | Gallmeyer | 340/461 |
| 4,936,533 | 6/1990 | Adams et al. | 248/222.1 |
| 4,948,242 | 8/1990 | Desmond et al. | 350/637 |
| 5,100,095 | 3/1992 | Haan et al. | 248/549 |
| 5,178,448 | 1/1993 | Adams et al. | 362/83.1 |
| 5,253,109 | 10/1993 | O'Farrell et al. | 359/604 |
| 5,285,060 | 2/1994 | Larson et al. | 250/214 |
| 5,327,288 | 7/1994 | Wellington et al. | 359/606 |
| 5,487,522 | 1/1996 | Hook | 248/549 |
| 5,521,760 | 5/1996 | De Young et al. | 359/601 |

(List continued on next page.)

FOREIGN PATENT DOCUMENTS

| | | |
|---|---|---|
| 0615882A2 | 9/1994 | (EP) . |
| 2192370A | 1/1988 | (GB) . |
| 2292857A | 3/1996 | (GB) . |
| 2297632A | 8/1996 | (GB) . |
| 58180347 | 10/1983 | (JP) . |
| WO8202448 | 7/1982 | (WO) . |

Primary Examiner—Donnie L. Crosland
(74) Attorney, Agent, or Firm—Van Dyke, Gardner, Linn & Burkhart, LLP

(57) ABSTRACT

An interior rearview mirror assembly for vehicles includes a mirror case having a reflective element and a carrier positioned in the mirror case. The mirror case is adapted to mount to a vehicle. The reflective element includes a substrate, with a reflective coating on one side of the substrate, and a window therethrough. The carrier has a display element for displaying one or more indicia through the window to define a display area on the reflective element. The carrier comprises a plate member, with a first portion and a second portion offset rearwardly from the reflective element and from the first portion. The second portion includes the display element. Preferably, the interior rearview mirror assembly further includes at least one light assembly for displaying the indicia through said window so that it is visible to an occupant of the vehicle.

73 Claims, 23 Drawing Sheets

U.S. PATENT DOCUMENTS

| | | | |
|---|---|---|---|
| 5,530,240 | 6/1996 | Larson et al. | 250/214 |
| 5,566,244 | 10/1996 | ul Azam et al. | 379/58 |
| 5,572,354 | 11/1996 | Desmond et al. | 359/265 |
| 5,576,687 | 11/1996 | Blank et al. | 340/438 |
| 5,615,857 | 4/1997 | Hook | 248/549 |
| 5,649,756 | 7/1997 | Adams et al. | 362/83.1 |
| 5,669,698 | 9/1997 | Veldman et al. | 362/83.1 |
| 5,671,996 | 9/1997 | Bos et al. | 362/83.1 |
| 5,673,994 | 10/1997 | Fant, Jr. et al. | 362/831 |
| 5,708,410 | 1/1998 | Blank et al. | 340/438 |
| 5,760,962 | 6/1998 | Schofield et al. | 359/604 |
| 5,798,688 | 8/1998 | Schofield | 340/438 |
| 5,812,321 | 9/1998 | Schierbeek et al. | 359/601 |
| 5,813,745 | 9/1998 | Fant, Jr. et al. | 362/83.1 |
| 5,820,245 | 10/1998 | Desmond et al. | 362/83.1 |
| 5,877,897 | 3/1999 | Schofield et al. | 359/604 |
| 5,878,353 | 3/1999 | ul Azam et al. | 455/550 |
| 5,929,786 | 7/1999 | Schofield et al. | 340/903 |
| 5,938,321 | 8/1999 | Bos et al. | 362/494 |
| 6,000,823 | 12/1999 | Desmond et al. | 362/494 |

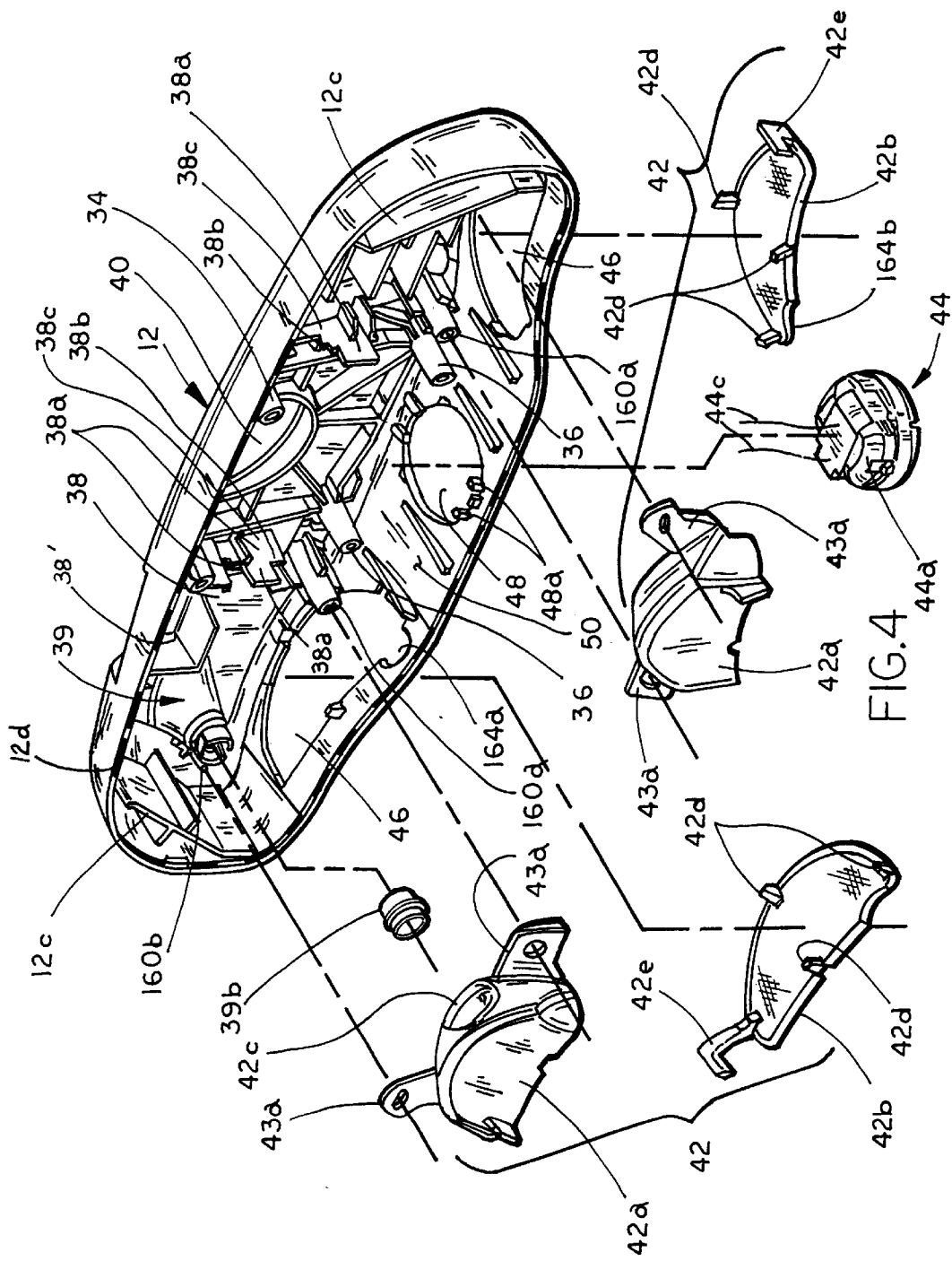

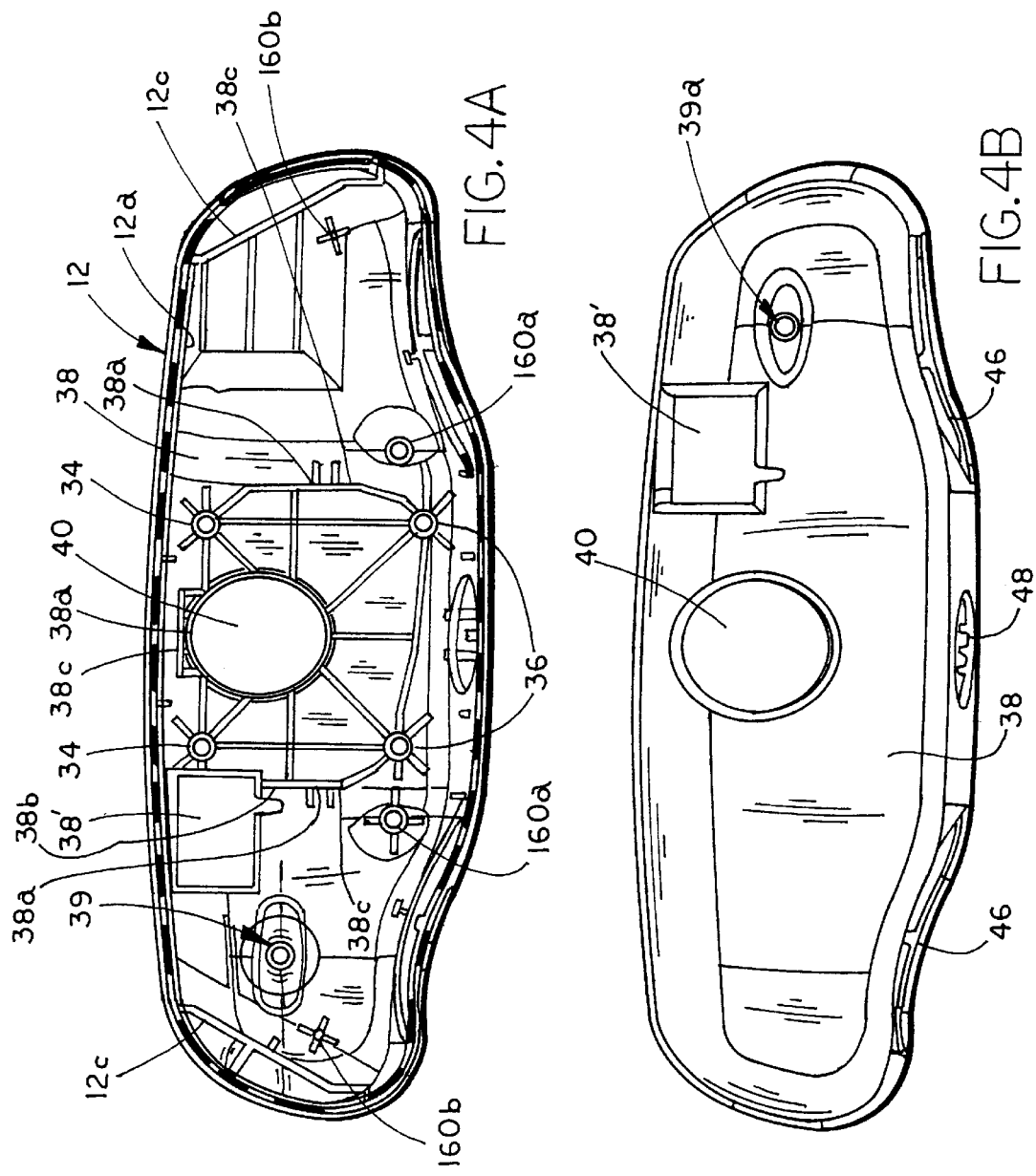

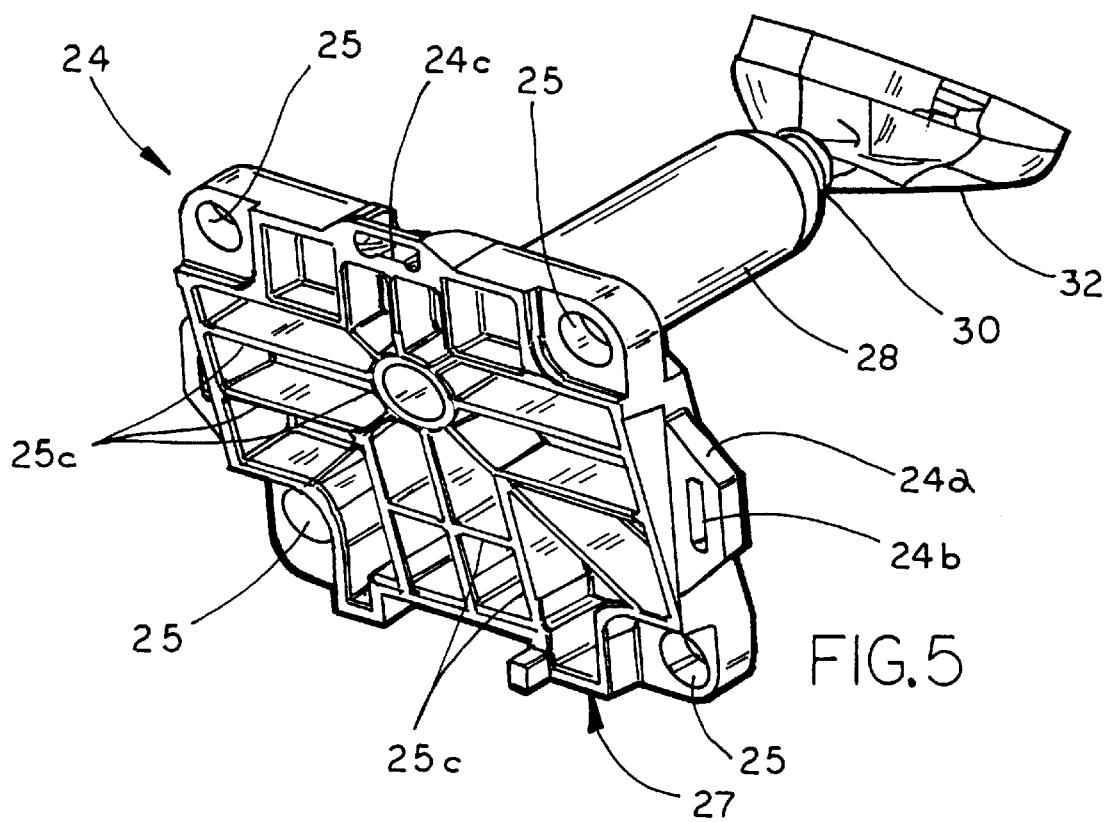
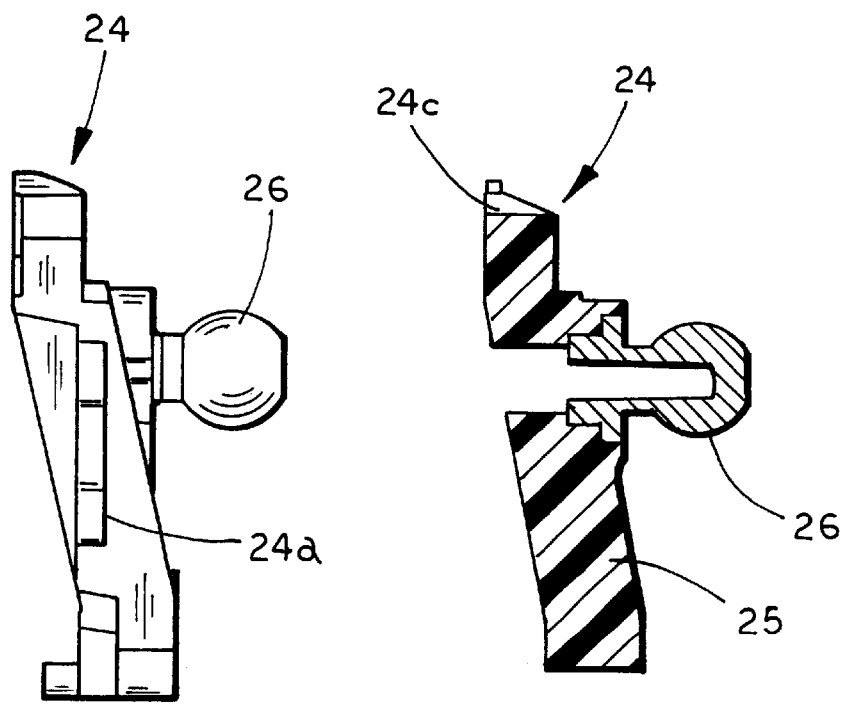

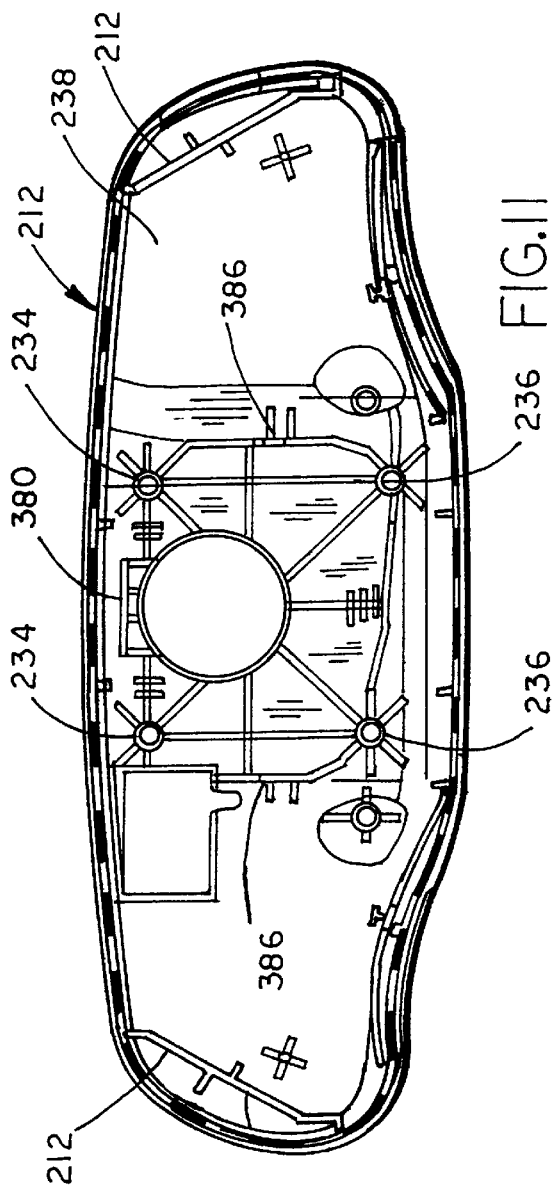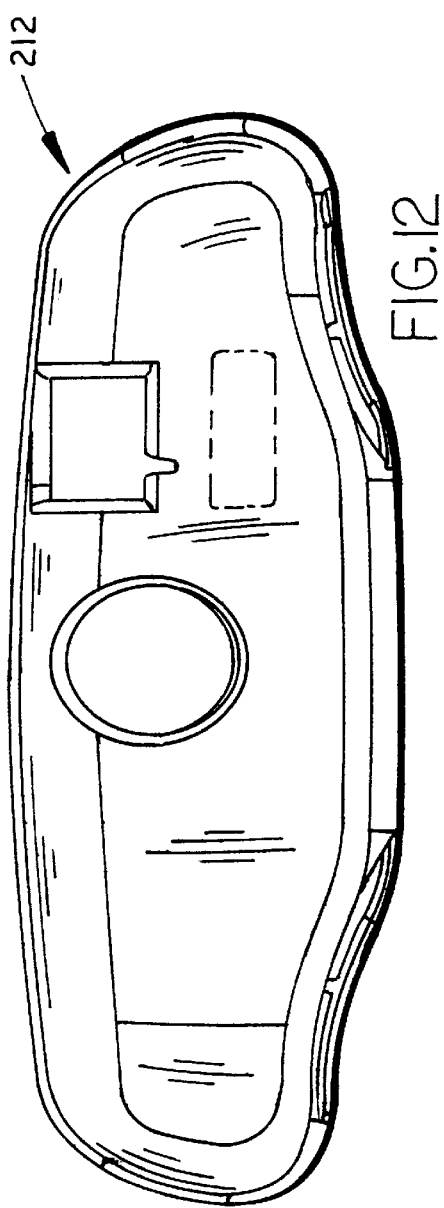

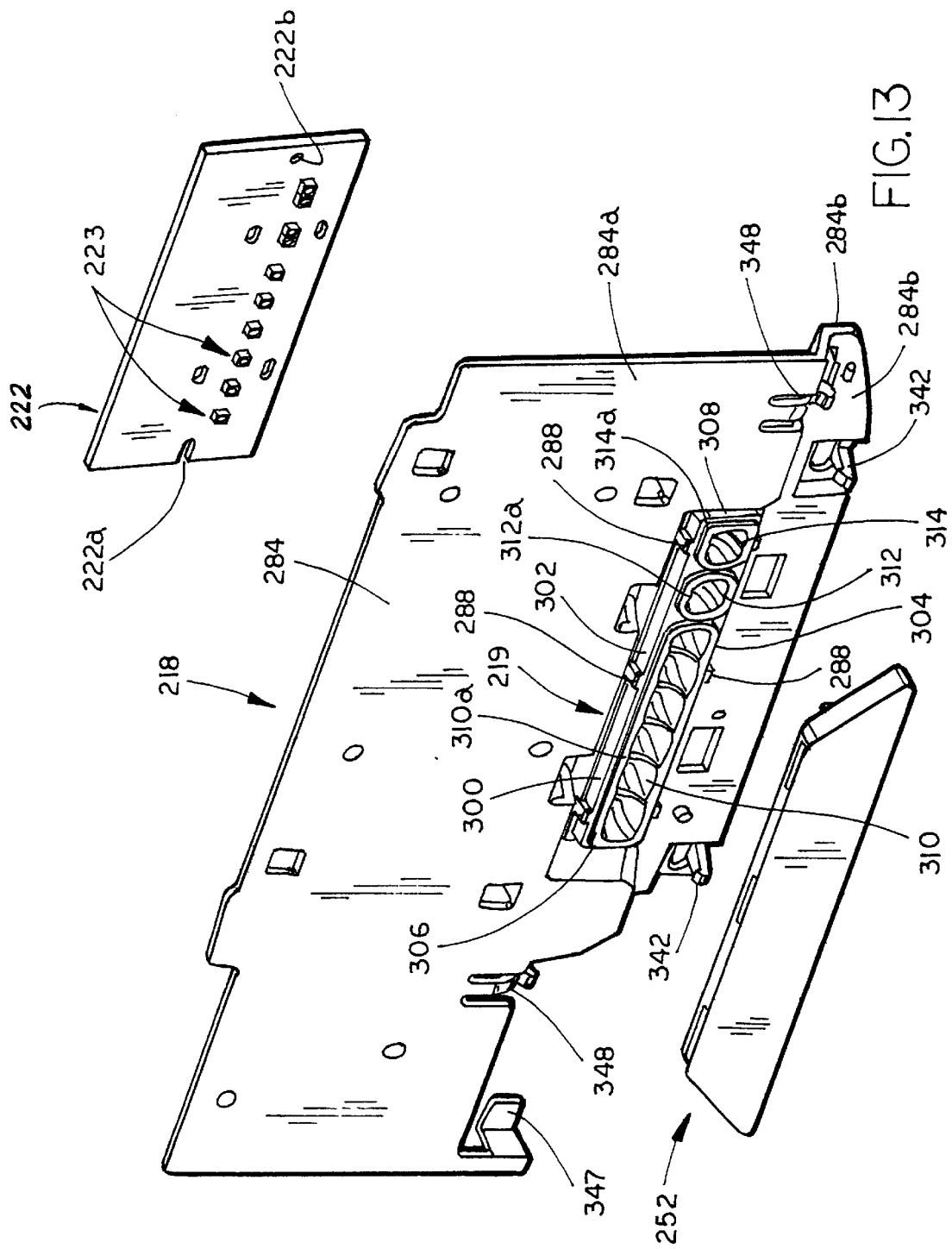

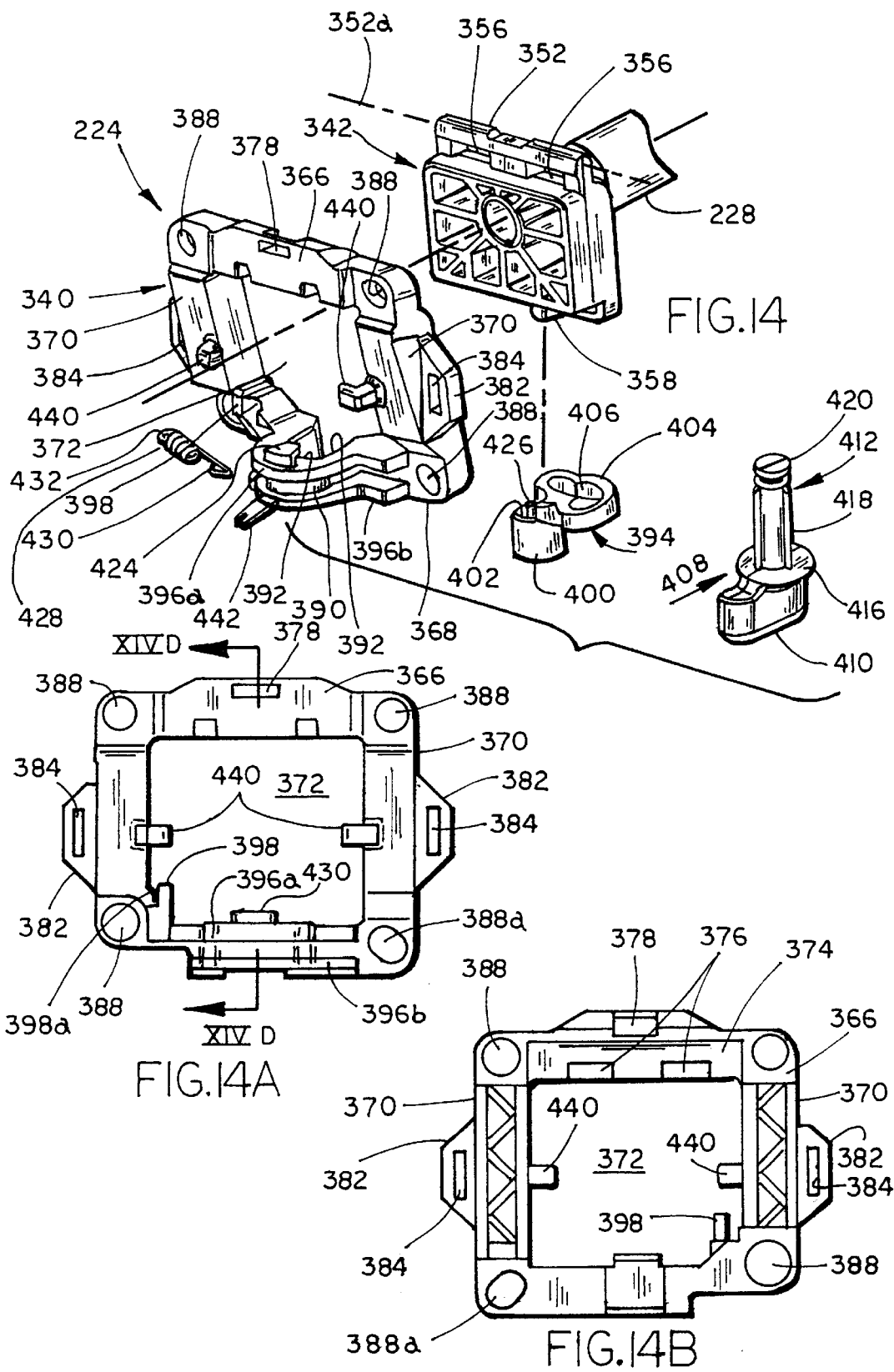

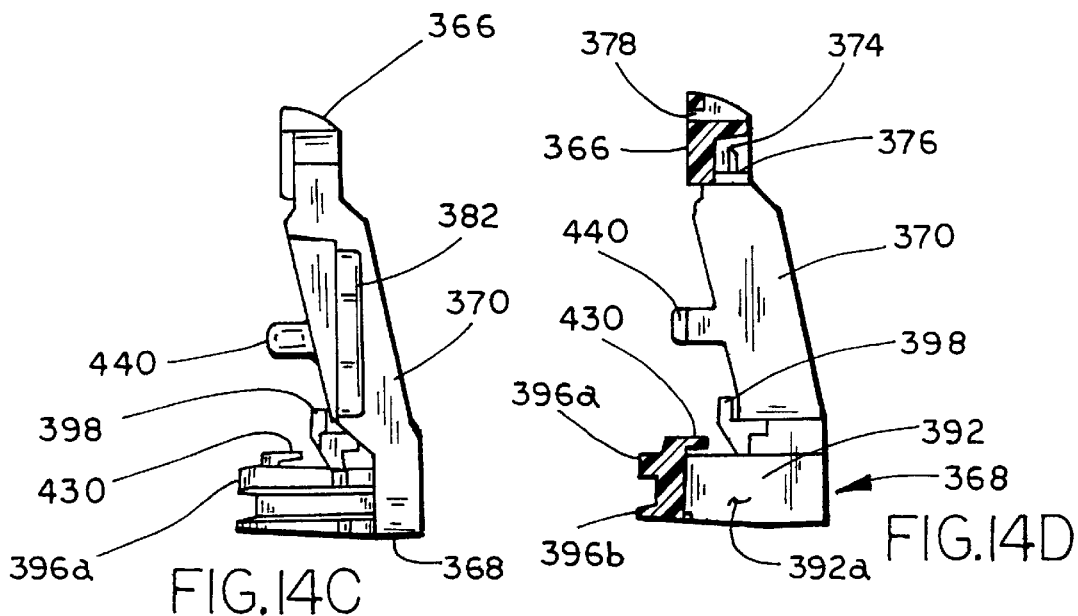
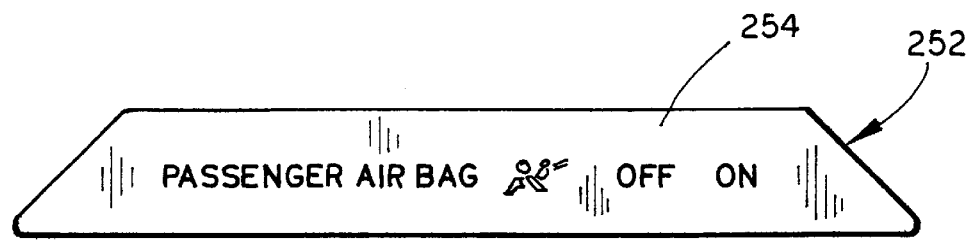
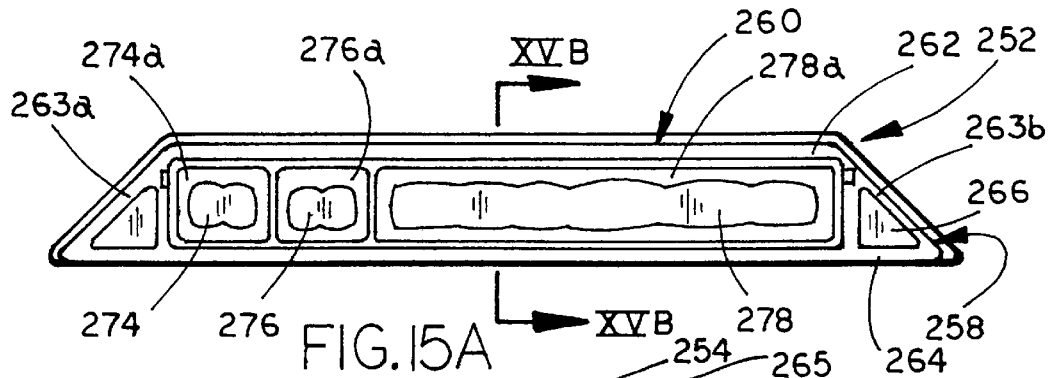
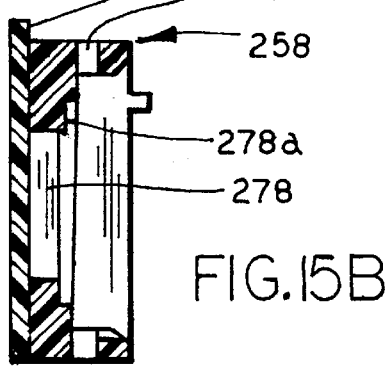

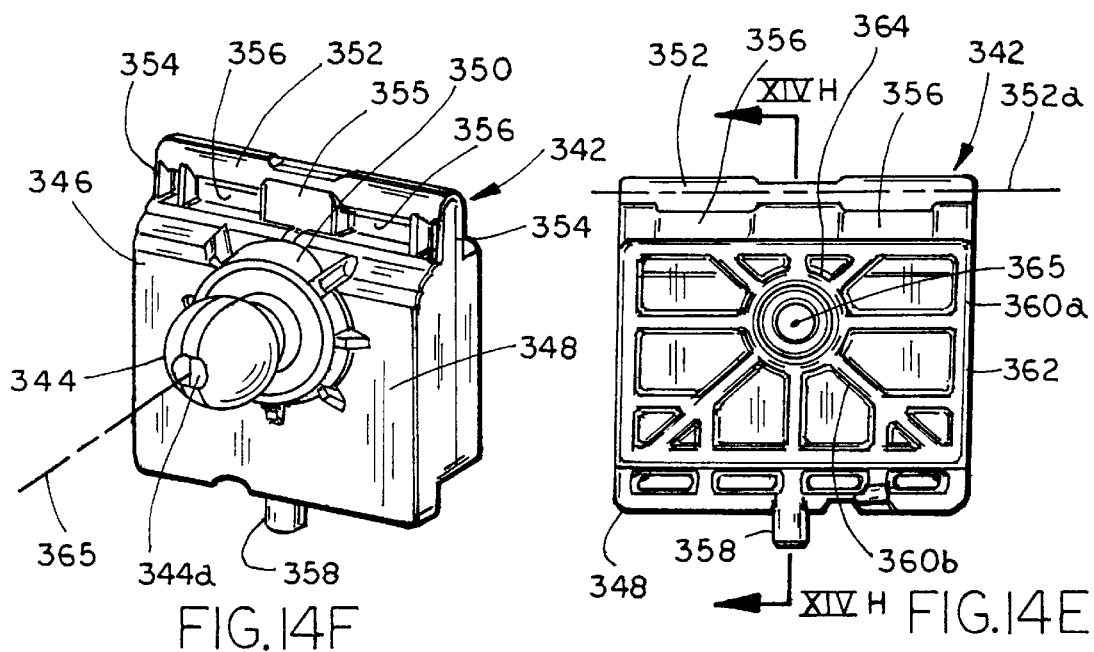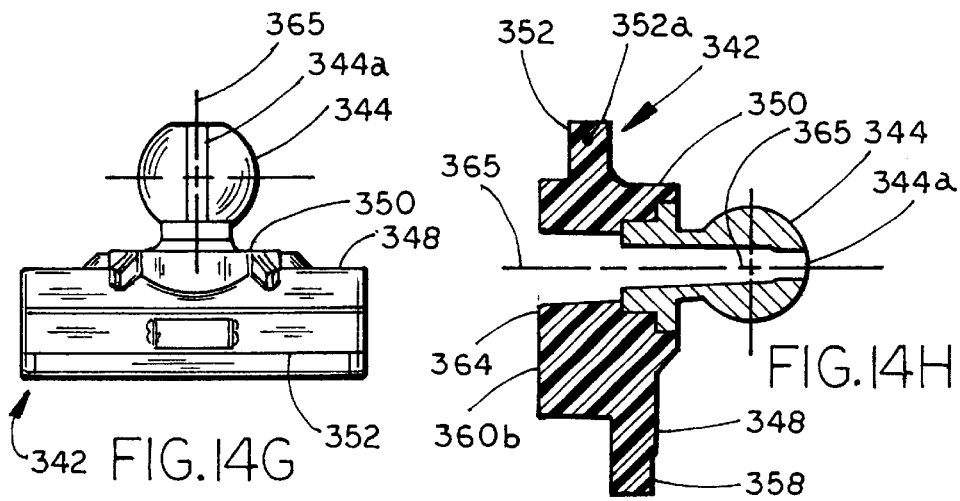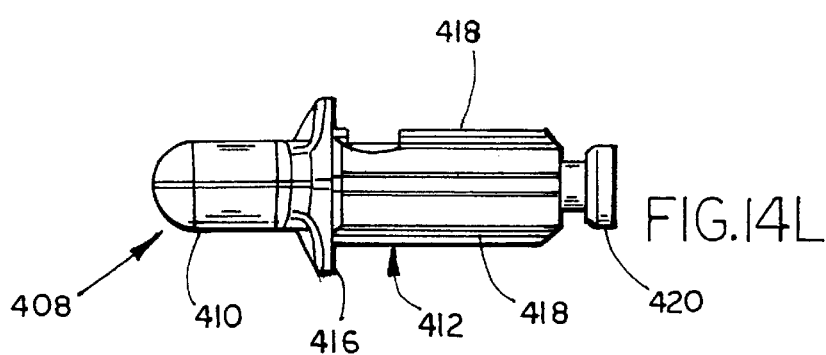

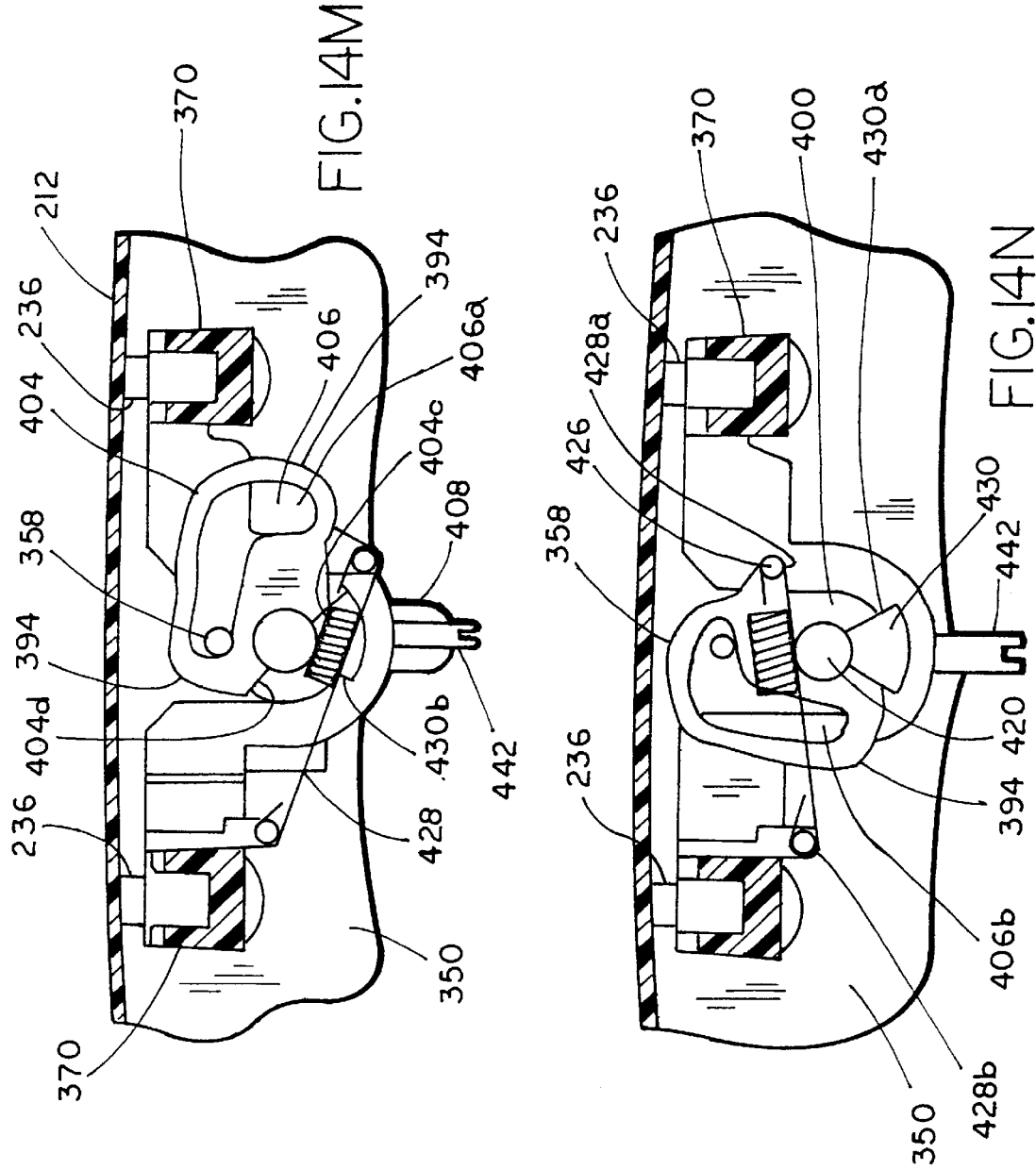

REARVIEW MIRROR ASSEMBLY WITH ADDED FEATURE MODULAR DISPLAY

TECHNICAL FIELD AND BACKGROUND OF THE INVENTION

The present invention relates to rearview mirror assemblies and, more particularly, to a modular variable reflectance interior rearview mirror assembly for use in vehicles incorporating information displays and controls for various electronic or electrical functions.

Variable reflectance interior rearview mirror assemblies include two basic designs: Prismatic mirrors and electrochromic mirrors. Conventional prismatic mirror assemblies include a reflective element having a wedge shape in cross section and a mechanical actuator which moves the mirror case and reflective element between a day viewing position and a night viewing position. Typical mechanical actuators include a bracket pivotally mounted to the rear wall of the casing and a toggle which pivots the mirror case and reflective element with respect to the bracket. However, these actuators often exhibit rotational movement between the casing and the bracket which can lead to increased vibration in the casing and reflective element. With increased vibration, the reflection in the reflective element is blurred. In addition, space within the prismatic mirror casing is limited by the actuator which moves within the casing.

More recently, prismatic mirrors have incorporated a number of electronic and electrical devices within the interior rearview mirror assembly, for example lights for illuminating maps or the dashboard and, furthermore, information displays which provide information to the driver or occupants of the vehicle such as warnings relating to the status of the passenger airbag. In commonly assigned copending application Ser. No. 09/244,726, filed by Jonathan E. DeLine and Niall R. Lynam, on Feb. 5, 1999, information displays are provided which include information relating to vehicle or engine status, warning information, and the like such as information relating to oil pressure, fuel remaining, time, temperature, compass headings for vehicle direction, and the like, the disclosure of which is incorporated herein by reference in its entirety. With the increased number of devices desired to be housed in the mirror case and the increased number of functions provided by the various devices, maximizing space or making more efficient use of the available space is highly desirable. In addition, because of the increase in included devices as well as the number of combined features, the rearview mirror assembly process has become more difficult and complex.

Electrochromic mirror assemblies, on the other hand, include a variable reflectance element in the form of an electro-optic cell or unit in which reflectivity is changed in response to changes in light and the amount of electrical voltage applied across the cell/unit. Therefore, electrochromic mirrors do not require an actuator. As a result, the interior of the electrochromic mirror casing has more space for incorporating further electronic and electrical features, such as map reading lights, as noted above, blind spot detection systems, rain sensor assemblies, video cameras for actuating windshield wipers or other purposes, or receivers, such as remote keyless entry receivers, cellular phone receivers, microphones, and the like. Heretofore, electrochromic mirror designs have included mirror casings with structural reinforcement which provides support for the reflective element in the casing, support for additional electronic or electrical features, and stiffness to the casing. However, such reinforcements reduce the potential available space in the mirror casing.

In the interest of economy and ease of assembly, it is highly desirable to simplify the assembly process by having a common modular design for both electrochromic and prismatic mirror assemblies. Heretofore, the designs of the mirror casings of the electrochromic and prismatic mirror assemblies have had different internal structures which result from their different mounting arrangements. As the desire to place more devices and features in the casing has increased, the economy and efficiency use of space is taken on increased importance.

Consequently, there is a need for a rearview mirror structure which permits a wide range of electrical and electronic components to be housed in the mirror housing, and which uses a plurality of common components to assemble either electrochromic or prismatic mirror assemblies as desired. Such structure would enhance the economy of the mirror assembly and, furthermore, would provide a product familiar to consumers and users regardless of whether the consumer/user purchases a prismatic or electrochromic mirror assembly.

SUMMARY OF THE INVENTION

The present invention provides a rearview mirror assembly incorporating a modular structure which provides for mounting either prismatic or electrochromic reflective elements, as well as an improved mounting arrangement for information displays.

In one form of the invention, a modular interior rearview mirror assembly for vehicles includes a mirror case having a reflective element, with the mirror case being adapted to mount to a vehicle. The reflective element includes a substrate and a reflective coating on one side of the substrate and a window therethrough. A carrier is supported in the case and includes a display element for displaying one or more indicia through the window to define a display area on the reflective element.

In one aspect, the case includes at least one electrical or electronic device which is supported by the carrier. For example, the device may be mounted to a circuit board, with the circuit board being supported by the carrier.

In another aspect, the carrier is adhered to the reflective element. In preferred form, the carrier comprises a plate member, which includes a first portion and a second portion offset rearwardly from the reflective element and from the first portion, with the second portion including the display element.

In yet other aspects, the carrier includes a plurality of light assemblies, with each light assembly being isolated from the adjacent light assemblies such that the light leakage between the respective light assemblies is substantially reduced. The carrier includes a body with a plurality of cavities formed therein and a plurality of light sources associated with the cavities, with the display element extending over the body and over the cavities. The cavities together with the light sources direct light to the display element for displaying the indicia. In preferred form, each cavity includes at least one opening through which the light sources direct light to the display element. Each of the cavities includes a reflecting surface associated with each light source for directing and defusing the light from the respective light source. Preferably, the reflecting surfaces comprise curved reflecting surfaces.

In yet further aspects, a frame is mounted to the display element, which mounts the display element onto the carrier over the body and the cavities. For example, the frame may include a base wall mounted to the display element, with the base wall including a plurality of openings corresponding to and aligning with the cavities of the body. The openings expose areas of the display element for displaying the indicia. In preferred form, the frame includes recessed landing surfaces extending around each of the openings. The body includes projecting perimeter walls around each of the cavities, with the perimeter walls seating on the landing surfaces of the frame to isolate each cavity in each of the areas of the display plate member to substantially reduce light leakage between the respective light assemblies.

According to another form of the invention, a modular interior rearview mirror assembly includes a mirror case having a prismatic reflective element and an actuator assembly supporting the case for shifting the mirror case between a day viewing position and a night viewing position. The actuator has a first member, which is adapted to mount the mirror case to a vehicle support mount, and a second member rigidly mounted to the mirror case. The first member includes first and second portions, with the second member being pivotally mounted to the first portion of the first member about a pivot axis and, further coupled to the second portion of the first member. The second member pivots about the first portion to thereby shift the mirror case between the day viewing position and the night viewing position.

In one aspect, the actuator further includes an actuator handle rotatably supported by the second member. Rotation of the actuator handle about an axis of rotation induces pivoting of the case about the first member on the pivot axis, which is generally orthogonal to the axis of rotation.

In further aspects, the first member includes a downwardly depending member, with the rotation of the actuator handle moving the second member with respect to the downwardly depending member to thereby pivot the case about the pivot axis.

In other aspects, the actuator assembly further includes a cam, with the actuator handle rotating the cam about the axis of rotation. When the cam rotates about the axis of rotation, the cam moves the first member with respect to the second member to thereby pivot the case between the day viewing position and the night viewing position.

Advantages provided by this invention include a structure having modular elements, which comprise common components for assembling a rearview mirror assembly, regardless of whether an electrochromic/electro-optic mirror assembly or a prismatic mirror assembly is desired. Additionally, the invention provides a more stable actuator for the prismatic mirror assembly design, which improves the vibration characteristics of and thus the visibility of reflected images in the reflective element assembly. Further, the invention provides improved space economizing support for various electronic and/or electrical features included in the assembly, as well as improved information display visible by drivers and passengers in the vehicle in which the assembly is mounted.

These and other objects, advantages, purposes, and features of the invention will become more apparent from the study of the following description taken in conjunction with the drawings.

BRIEF DESCRIPTION OF THE DRAWINGS

FIG. 4 is an enlarged, exploded perspective view of the mirror casing of the interior rearview mirror assembly of FIG. 1 including light assemblies and a microphone module;

FIG. 4A is a front elevation view of the mirror case of the mirror assembly of FIG. 1;

FIG. 4B is rear elevation view of the mirror case of the mirror assembly of FIG. 1;

FIG. 5 is an enlarged perspective view of the mounting bracket and mirror support of the exterior rearview mirror assembly of FIG. 1;

FIG. 5D is a side elevation view of the mirror mounting bracket of FIG. 5;

FIG. 5E is another sectional side elevation of the mounting bracket taken along line VE—VE of FIG. 5A;

FIG. 11 is a front elevation of the mirror case of the mirror assembly of FIG. 8;

FIG. 12 is a rear elevation of the mirror case of the mirror assembly of FIG. 8;

FIG. 13 is an enlarged perspective view of an attachment plate and LED board of the mirror assembly FIG. 8;

FIG. 14 is an exploded perspective view of an actuator of the mirror assembly of FIG. 8;

FIG. 14A is a front elevation of an outer bracket of the actuator of FIG. 14;

FIG. 14B is a rear elevation view of the outer bracket of FIG. 14A;

FIG. 14C is a side elevation of the outer bracket of FIG. 14A;

FIG. 14D is a sectional side elevation of the outer bracket taken through line XIVD–XIVD of FIG. 14A;

FIG. 14E is a front elevation of an inner bracket of the actuator assembly of FIG. 14;

FIG. 14F is a rear perspective of the inner bracket of FIG. 14E;

FIG. 14G is a top view of the inner bracket of FIG. 14E;

FIG. 14H is a sectional side elevation of the inner bracket taken along line XIVH—XIVH of FIG. 14E;

FIG. 14L is a front elevation of the actuator knob of FIG. 14K;

FIG. 14M is a sectional plan view taken along line XIVL—XIVL of FIG. 10 illustrating the actuator knob rotating the cam to a day viewing position;

FIG. 14N is a sectional plan view similar to FIG. 14M but illustrating the actuator knob rotating the cam to a night viewing position;

FIG. 15 is a front elevation of the display module of the interior rearview mirror assembly of FIG. 8;

FIG. 15A is a rear elevation view of the display module of FIG. 15; and

FIG. 15B is a sectional end elevation of the display module taken along line XVB—XVB of FIG. 15A.

DESCRIPTION OF THE PREFERRED EMBODIMENTS

Figure 1:
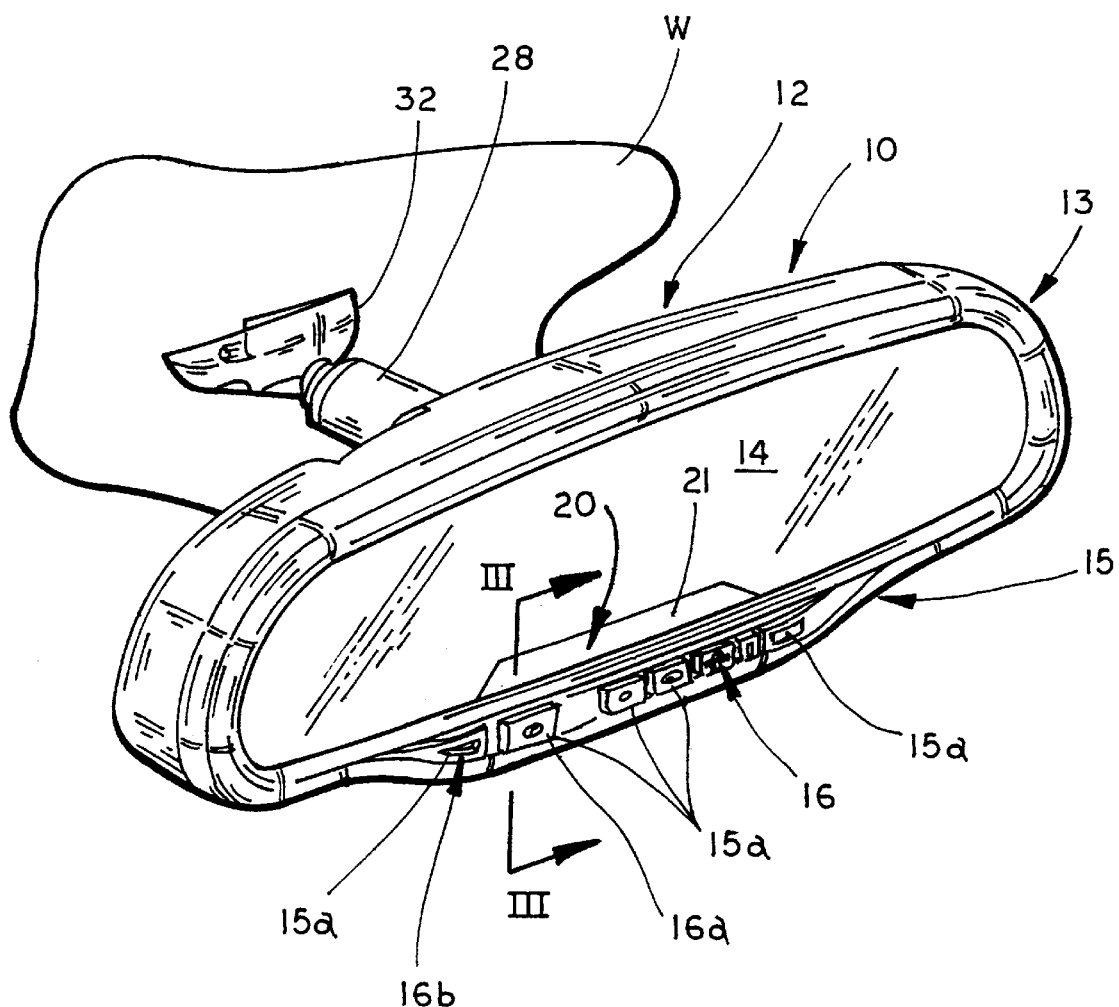
FIG. 1 is a front perspective view of the first embodiment of the interior rearview mirror assembly of the present invention showing the interior rearview mirror assembly in a viewing position on a front windshield of a vehicle.

Referring now to FIG. 1, a first embodiment 10 of an interior rearview mirror assembly for vehicles of the present invention includes an improved structure incorporating modular elements or units and a light module for illuminating an information display area 20 of assembly 10. In the illustrated embodiment, assembly 10 is adapted to be releasably coupled or secured to the front windshield W of a vehicle below the headliner header section of the interior roof in position for viewing by the driver in a direction generally rearwardly of the vehicle. It should be understood that assembly 10 may also be mounted to the headliner or to other structures of the vehicle.

Mirror assembly 10 includes a mirror case or housing 12, a bezel 13, and a mirror reflective element 14. Bezel 13 includes an enlarged chin area 15 positioned below the viewing area of reflective element 14, with a plurality of openings 15a (FIG. 2) for receiving a user actuatable interface; for example user actuatable buttons 16a and indicators 16b that preferably are formed as a single unit key pad 16.

Key pad 16 is preferably formed from a resilient material and, most preferably from a silicone material. Key pad 16 is positioned behind bezel 13 and provides on/off functions and indicators for various vehicle and/or mirror assembly functions, as will be more fully described below.

Figure 5B:
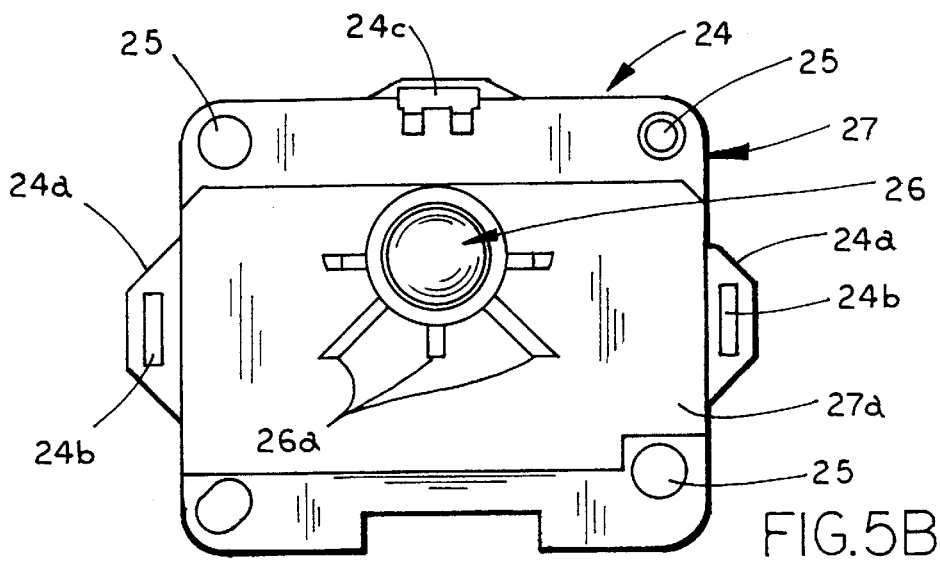
FIG. 5B is a rear perspective view of the minor mounting bracket of FIG. 5.
Figure 5A:
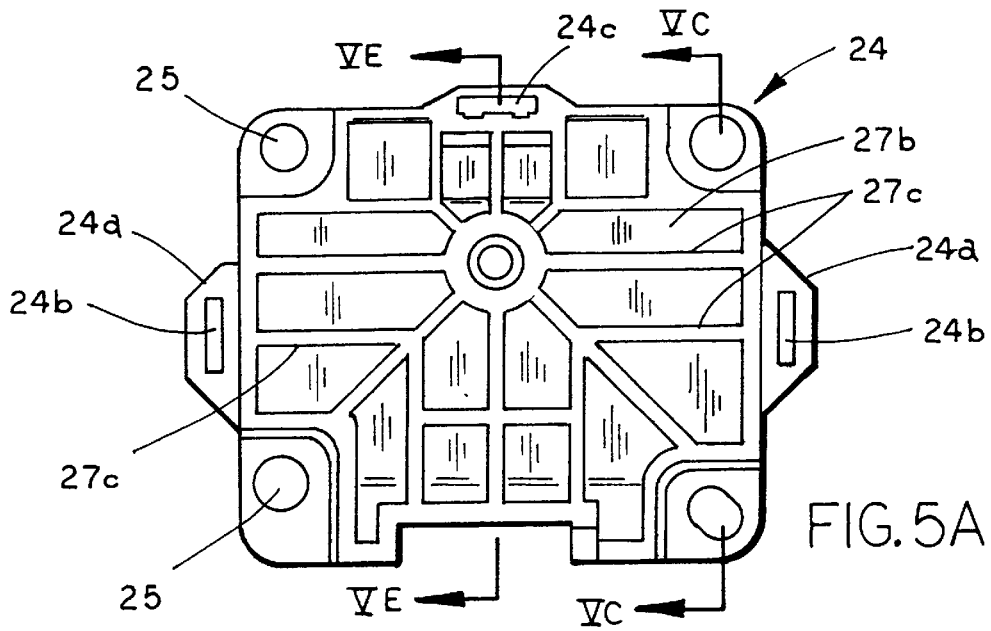
FIG. 5A is a front elevation view of the mounting bracket of FIG. 5.
Figure 5C:
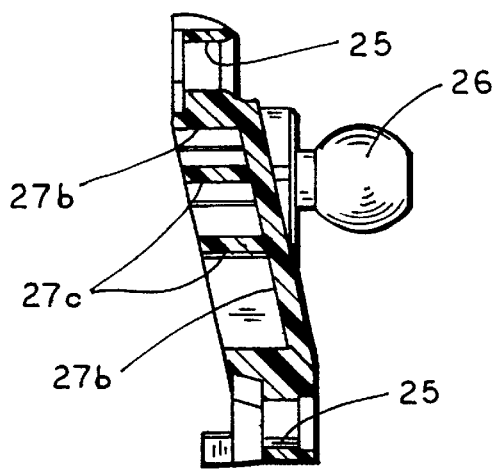
FIG. 5C is a sectional side elevation of the mounting bracket taken along line VC—VC of FIG. 5A.

Case 12 is mounted to windshield W by mounting bracket 24 and support 28 (FIGS. 1, 2, 3, and 5). Referring to FIGS. 5 and 5A–5E, mounting bracket 24 includes a rearwardly extending ball mount 26 which mounts mirror assembly 10 onto a support arm 28. Bracket 24 is preferably formed from a resinous polymeric or plastic material and, more preferably, from a mineral filled polypropylene, such as glass or mineral filled nylon, for example RENY 252A. Ball mount 26 is preferably a zinc ball stud and preferably insert molded into bracket 24. Bracket 24 is rigidly mounted to rear wall 38 of case 12 preferably by heat staking onto projecting members, such as mounting bosses 34 and 36 (FIGS. 4 and 4A) which project outwardly from back wall 38 of case 12 and which extend into openings 25 provided at each corner of bracket 24 (FIGS. 5 and 5A–B). In addition, bracket 24 includes outwardly extending flanges 24a each having an elongate opening 24b and an elongate opening 24c at its upper perimeter which receive corresponding flanges 38a in case 12 which are also heat staked to bracket 24. Flanges 38a also provide a guide for proper alignment of bracket 24 on back wall 38. In addition, flanges 38a are located along ribs 38c which provide a landing or seat 38b for bracket 24 to further distribute the load of bracket 24 across back wall 38 of case 12 and to increase the stiffness of bracket 24.

Figure 3:
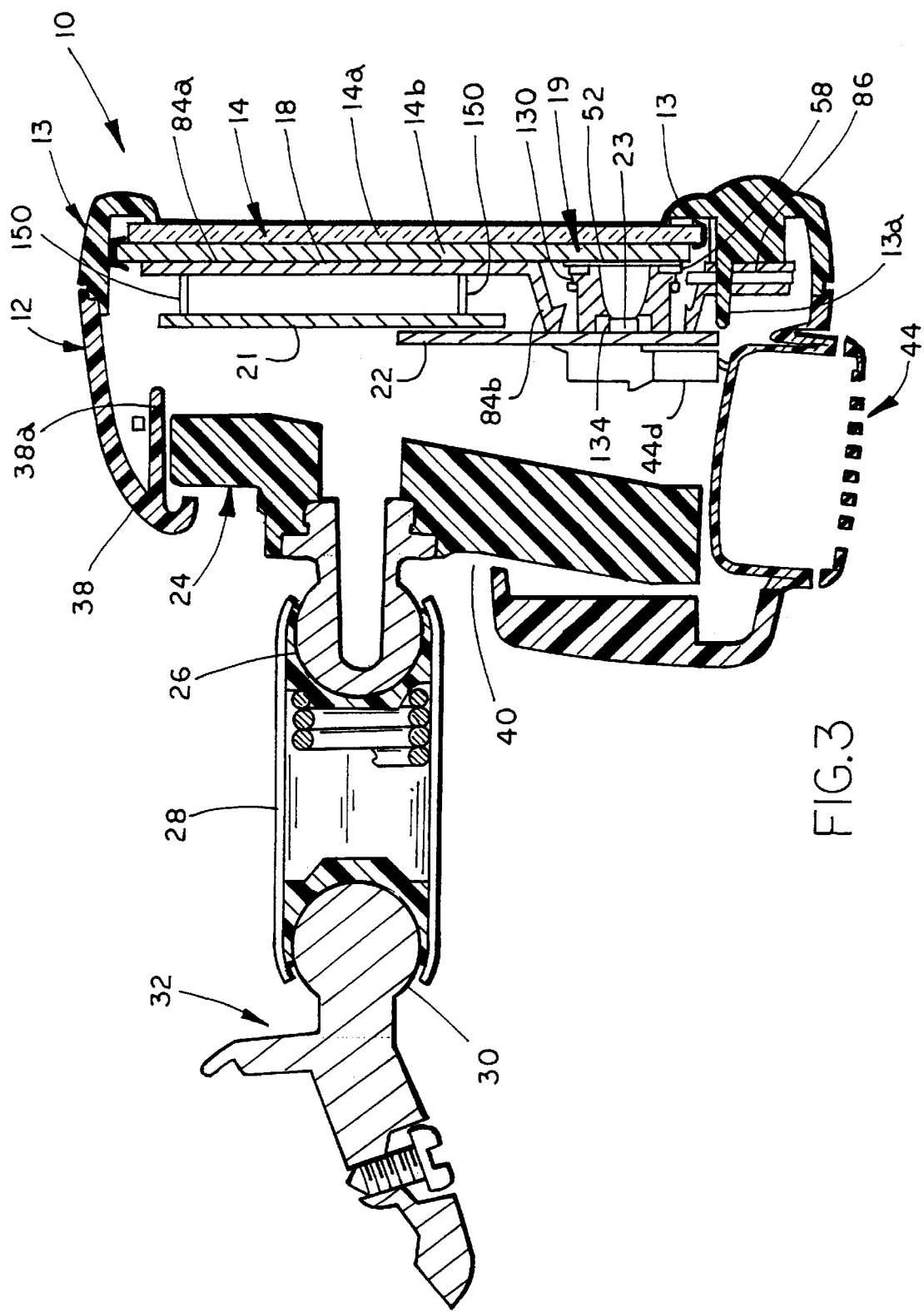
FIG. 3 is a cross-section view of the mirror assembly of FIG. 1 and taken along line III—III of FIG. 1.

When bracket 24 is mounted on bosses 34, 36, and flanges 38a, ball mount 26 is aligned with an opening 40 provided on back wall 38 of case 12 through which ball mount 26 extends for coupling to support arm 28 (FIGS. 3 and 4). As best seen in FIGS. 3 and 5, support arm 28 preferably comprises a dual ball mount arrangement which receives ball mount 26 on one end and a second ball mount 30 from a mirror mounting bracket 32 to permit positioning and adjustment of case 12 when mounted on the vehicle. Bracket 32 preferably comprises a break-away mounting bracket for releasably coupling to a windshield mounting button on windshield W or a header mount at an upper edge of the windshield in a conventionally known fashion. Examples of suitable mounting brackets or mounting arrangements are disclosed in U.S. Pat. Nos. 5,487,522; 5,671,996; 5,820,097; 5,615,857; 5,330,149; 5,100,095; 4,930,742; or 4,936,533 or co-pending U.S. patent application Ser. No. 08/781,408, filed Jan. 10, 1997, now U.S. Pat. No. 5,820,097, all commonly-assigned to Donnelly Corp., the disclosures of which are hereby incorporated herein by reference in their entireties.

In preferred form, bracket 24 has generally rectangular body 27 with openings 25 provided at each corner for receiving bosses 34 and 36 therein, and elongate openings 24b, 24c for receiving flanges 38a therein. Body 27 may be solid or may be molded with planar rear surface 27a (FIG. 5B) and a plurality of voids or recessed areas 27b defined by a plurality of interconnecting webs or ribs 27c formed on its front side which provide for a rigid bracket 24 without the added weight associated with a solid bracket.

Figure 2:
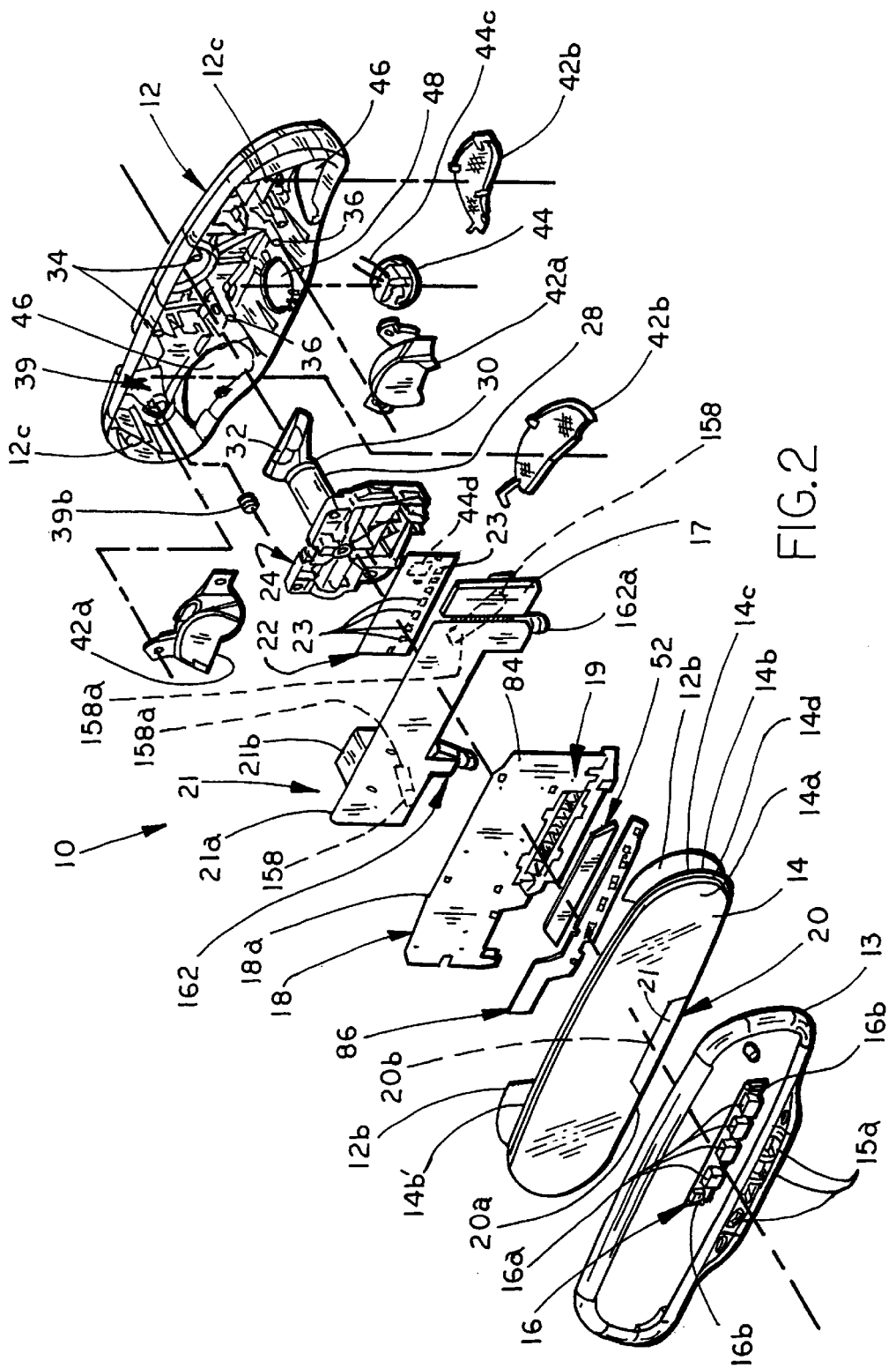
FIG. 2 is an exploded perspective view of the rearview mirror assembly of FIG. 1.

Reflective element 14 preferably comprises an electro-optic reflectance element or unit that includes a transparent front sheet 14a and a transparent rear sheet 14b having a reflective coating 14c applied to its rear surface (FIG. 2). Sheets 14a and 14b are preferably glass sheets, with the front glass sheet 14a being slightly offset relative to second glass sheet 14b such that the upper and lower edges project for connection to appropriate metal connection strips. A variable light transmittance, electrochromic medium 14d is sandwiched between front and rear sheets 14a and 14b. The front surface of rear glass 14b and rear surface of front glass 14a each have a transparent electroconductive coating, such as an indium tin oxide or doped tin oxide or the like, to conduct electricity across electrochromic medium 14d by way of the connection strips secured at the offset top and bottom of the front and rear glass sheets 14a and 14b. When an electrical voltage is applied across the electro-optic element between front glass 14a and rear glass 14b, the transmittance of layer 14d varies. For example, it may darken or become more opaque, to reduce light reflected by the reflective coating 14c on reflective rear glass 14b. Electrochromic medium 14d may, for example, comprise an electrochemichromic medium such as described in commonly assigned U.S. Pat. Nos. 5,140,455 and 5,151,816, or a solid state electrochromic medium such as described in the following publications: N. R. Lynam, "Electrochromic Automotive Day/Night Mirrors", *SAE Technical Paper Series* 870636 (1987); N. R. Lynam, "Smart Windows for Automobiles", *SAE Technical Paper Series* 900419 (1990); N. R. Lynam and A. Agrawal, "Automotive Applications of Chromogenic Materials", *Large Area Chromogenics: Materials and Devices for Transmittance Control*, C. M. Lampert and C. G. Grandquist, EDS., Optical Engineering Press, Washington (1990), the disclosures of which are hereby incorporated by reference herein in their entireties. Other suitable electrochromic reflectors are described in U.S. Pat. Nos. 5,567,360; 5,525,264; 5,610,756; 5,406,414; 5,253,109; 5,076,673; 5,073,012 or 5,117,346, which are all commonly assigned to Donnelly Corporation, the disclosures of which are herein incorporated by reference in their entireties.

Typically, the two glass plates sandwich the electrochromic medium. A reflective coating may be deposited either on the rear most surface away from the viewer (to create a fourth surface reflector as is known in the art) or disposed on the front surface of the rear most substrate (to create a third surface reflector as is known in the art). The substrates can be of equal or different glass thicknesses. The electrochromic medium can be a liquid medium or a solid medium, such as a solid polymer matrix electrochromic medium such as is disclosed in U.S. patent application Ser. No. 09/350,930 filed Jul. 12, 1999 titled "Electrochromic Polymeric Solid Films, Manufacturing Electrochromic Devices Using Such Films, And Processes For Making Such Solid Films And Devices" to Desaraju V. Varaprasad et al., the entire disclosure of which is hereby incorporated by reference herein. For example, an interior rearview mirror can comprise a 1.1 mm thick front substrate, a 2 mm thick rear substrate, and an aluminum silver, silver alloy, aluminum alloy or the like highly reflective metal film on the front surface of the rear substrate (i.e. third surface reflector) and the electrochromic medium may be solid such as electrochromic Solid Polymer Matrix (SPM)™ comprising a color changing cross-linked polymer solid film. Most preferably, the front substrate comprises a glass plate of thickness less than about 1.6 mm, most preferably about 1.1 mm thickness or lower, and the rear substrate comprises a glass plate of thickness equal to or greater than about 1.6 mm, more preferably greater than about 1.8 mm thickness, most preferably equal to or greater than about 2.0 mm thickness. The rearmost surface of the rear substrate (the fourth surface as known in the mirror art) is reflector coated with a high reflecting metal film such as of aluminum or silver, or an alloy of aluminum or silver. Most preferably, the frontmost surface of the rear substrate (the third surface as known in the mirror art) is reflector coated with a high reflecting metal film such as of aluminum or silver, or an alloy of aluminum or silver.

Optionally, the front surface of the front substrate 14a (i.e. the first surface as known in the mirror art) can be coated with a surface coating or otherwise modified so as to reduce the build up of condensation or mist such as can occur in humid climates. For example, the front surface of the front substrate 14a (which is the surface upon which condensation/mist might gather or which would be subject to raindrops should the vehicle be a convertible and be driven with hood down during rain) may be optionally coated with a water wetting characteristic modification coating such as a hydrophilic coating such as a photocatalytic hydrophilic coating system such as is disclosed in Japanese Patent Abstract JP11050006A, issued Feb. 23, 1999, titled "Pretreatment of surface Forming Photocatalytic Hydrophilic Film and Cleaning Agent and Undercoating Composition Used Therein" to Mitsumasa et al of Toto Ltd, and in JP10330131A, issued Dec. 15, 1998, titled "Hydrophilic Thin Film and Vehicular Mirror and Glass Product Using The Same Hydrophilic Thin Film" to Tsutomu et al of Ichikoh Ind Ltd, and in JP10036144A, issued Feb. 10, 1998, titled "Antifogging Element" to Toru et al of Murakami Corporation, and in U.S. Pat. No. 5,724,187, issued Mar. 3, 1998, titled "Electrochromic Mirrors and Devices" to Varaprasad et al of Donnelly Corporation, the disclosures of which are hereby incorporated by reference herein. Also, such wetting characteristic modification coatings and techniques, such as photocatalytic hydrophilic coatings, can be used for the first (frontmost) surface of a non-electrochromic reflective element such as a prismatic interior mirror reflective element (and for the first surface of electrochromic exterior mirror reflective elements and of metal coated, such as chromium coated, exterior non-electrochromic mirror reflective elements).

In order to control the reflectance of reflective element 14, case 12 includes a light sensor, which is positioned in hollow socket 39 which includes a rearward opening 39a in back wall 38 of case 12 (FIGS. 4, 4A and 4B). Positioned in socket 39 is a lens cover 39b through which the light sensor detects the light level outside the vehicle. The driving circuit for varying the transmittance of layer 14d is preferably supported on electrochromic circuit board 17 (FIG. 2), which is supported on an attachment plate 18 via a circuit board 21, described below. Examples of suitable driving circuits can be found in the referenced U.S. patents.

As best understood from FIGS. 2 and 3, reflective element 14 is supported and retained in a rear facing opening of case 12 by bezel 13. Bezel 13 and case 12 are both formed preferably from resinous polymeric material or plastic and, more preferably, a melt-processible plastic, and most preferably an engineering polymer, for example an ABS plastic. Bezel 13 extends around and over the perimeter of reflective element 14 and engages a plurality of engaging structures 12d provided at the perimeter of case 12 to thereby support and retain reflective element 14 in case 12. Mounted to the rear surface 14b' of sheet 14b by an adhesive are foam or resilient pads 12b (FIG. 2) which rest on ribs or webbing 12c (FIGS. 2 and 4) provided on case 12. Webbing 12c extends diagonally across case 12 at each end of case 12 so as to provide additional support for the end portions of reflective element 14 when bezel 13 is mounted to case 12. Pads 12b act as shock absorbers to reduce the vibration in reflective element 14 and, further, reduce the risk of breaking glass sheets 14a and 14b during impact. In the preferred form, pads 12b are cross linked polyethylene foam. In the illustrated embodiment, pads 12b comprise generally semicircular pads and generally follow the outline of the ends of reflective element 14. However, it can be appreciated that pads 12b may have other shapes or configurations, and may be positioned in other locations.

As best seen in FIG. 2, reflective element 14 includes a window 21 which provides a display area 20. Window 21 (FIG. 1) is formed in the reflective element, for example by the absence or reduction, such as by removal, of a portion of the reflective coating 14c of second sheet 14b. As an alternative to removing or substantially removing the mirror reflector coating from a rear surface of the substrate in order to create a light transmitting window therethrough, a semi-transparent but significantly reflective coating can be used to function akin to a one-way mirror for the display. For example, a silicon mirror can be used or a dichroic filter, preferably with a bandpass of light transmission tuned to match the wavelength of the light emitted by the display placed therebehind, can be used, and such silicon and dichroic filters are described in U.S. Pat. No. 5,668,663 to Varaprasad et al and assigned to Donnelly Corp., and in U.S. Pat. No. 5,207,492 to Roberts, and assigned to Muth Corp., both of which disclosures are incorporated in their entireties by reference herein. As will be more fully described below, a display element 54 of a light module 19 and light emitted therefrom are positioned behind reflective element 14 and are aligned with and transmit through the corresponding light transmitting window 21 created in the reflector of reflective element 14 for displaying indicia through window 21 to form display area 20. Where the reflective coating is only reduced in thickness as compared to the absence of the reflective coating, the display area will not become apparent until actuated, as would be understood by those skilled in the art.

In the illustrated embodiment 10, window 21 comprises a generally trapezoidal area, which is preferably located at a central lower edge 20a of reflective element 14. However, it should be understood that the display area can be located elsewhere, for example along an upper edge or side edge of reflective element 14. Display area 20 is used to provide information, such as by way of alpha-numeric indicia or symbolic or graphical indicia, such as icons, including for example passenger safety information, such as Passenger Side Inflatable Restraint (PSIR) status or Supplemental Inflatable Restraint (SIR) status. The luminous intensity of the Passenger Side Inflatable Restraint display that indicates the status of activation/deactivation of passenger-side airbags (or of Side-airbag Inflatable Restraint display in the case where the vehicle is equipped with side airbags) should be sufficiently intense so as to be readily visible by vehicle occupants, even under high ambient lighting conditions such as during daylight driving. In this regard, it is desirable that the luminous intensity of the display, as displayed to the vehicle occupant, be at least about 100 candelas/sq. meter during daytime; preferably at least about 250 candelas/sq. meter, more preferably at least about 500 candelas/sq. meter and most preferably, be at least about 750 candelas/sq. meter in luminous light intensity. Also, it is desirable that the daytime display light intensity be reduced during night time driving to a lower luminous light intensity, preferably below about 50 candelas/sq. meter, more preferably to below about 30 candelas/sq. meter and most preferably to below about 15 candelas/sq. meter. Various methods can be employed to achieve night-time display dimming including using a signal, typically a pulse-width modulated signal, from the vehicle that cause the mirror display to dim in tandem with the lights in the instrument panel. Another option is to use a mirror-mounted photosensor that causes the mirror-mounted display to dim when low ambient conditions are detected, such as is described in U.S. Pat. Nos. 5,416,313 and 5,285,060, the disclosures of which are incorporated by reference herein. Should the mirror mounted display be displaying from behind a window created in an electrochromic reflective element, then display re-brightening to compensate for any decrease in transmission of the electrochromic medium may be employed, such as is disclosed in U.S. Pat. Nos. 5,416,313 and 5,285,060. Should a compass display be used in the electrochromic mirror assembly that is subject already to display re-brightening, then the mirror-mounted airbag status display may be slaved off the same control, or it may be subject to an independent control. Also, where the airbag status display dims at night under command of a signal from the vehicle electronics such an instrumentation panel light dimming signal, the state of coloration of any electrochromic reflective element present can be monitored, and the intensity of the airbag or similar display present can be increased when it is determined that the electrochromic element has dimmed due to the presence of glare from following headlights.

As best seen in FIG. 3, light module 19 contacts rearward surface 14b' of sheet 14b and is aligned with window 21 and includes a display module 52 on which various indicia are formed or etched or provided thereon (FIGS. 2, 6, 7, and 7A–7D). Preferably, display module 52 includes indicia formed thereon, in which case the indicia are illuminated by light sources 23 described in greater detail below. Optionally, indicia may be formed by selectively actuating light sources. For example, an array of light sources may be provided with selected light sources in the array being actuated to project patterns of light onto the display module which patterns form the indicia.

Referring to FIGS. 7 and 7A–7D, display module 52 is an assembly or unit of similar trapezoidal shape to window 21 and includes a display element 54, which is preferably black and translucent with the indicia being formed, etched, or printed on a rear surface 54a of element 54. As previously noted, indicia may be formed by selective actuation of light sources 23 as well. Element 54 is preferably a plate element formed from resinous polymeric material such as glass filled polycarbonate, for example available under the name BAYER SCR26033705PC. Optionally, the indicia may be formed by partial removal of the black pigment so that the indicia is not visible until back-lit and illuminated by light sources 23, more fully described below. As best seen in FIGS. 7A–7D mounted to rear surface 54a of element 54 is a frame or carrier member 58, which is also preferably formed from a resinous polymeric material. Frame 58 may be adhered to element 54 by an adhesive or may be integrally molded with element 54. Frame 58 is also preferably trapezoidal shape and includes a base or back wall 66 and a perimeter wall 60 which defines upper and lower side walls 62 and 64 and end side walls 63a and 63b. Side walls 62 and 64 include elongated openings or slots 65 for mounting graphics module 52 to attachment member 18 over light assemblies 90, 92, and 94, more fully described below. Perimeter wall 60 projects outwardly from back wall 66, with upper side wall 62 and lower side wall 64 being interconnected at opposed ends by end side walls 63a and 63b and intermediate walls 68 and 70. Projecting outwardly from intermediate walls 68 and 70 are a pair of stops 72 which act as locators for installing display module 52 onto attachment member 18.

Figure 7:
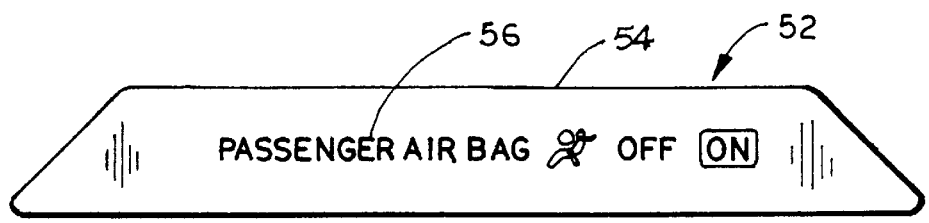
FIG. 7 is an enlarged front elevation of a display module of the interior rearview mirror assembly of FIG. 1.
Figure 7A:
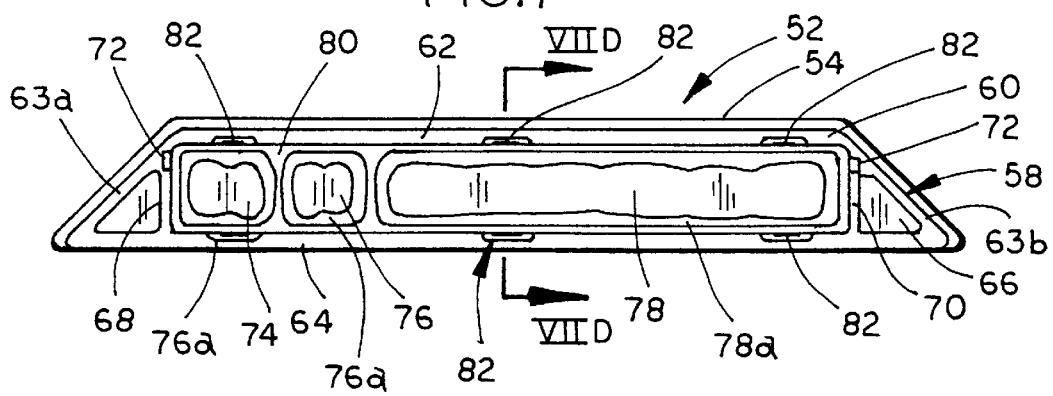
FIG. 7A is a rear elevation of the display module of FIG. 7.
Figure 7B:
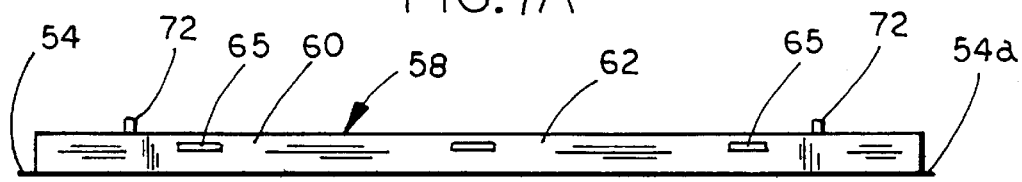
FIG. 7B is a top view of the display module of FIG. 7.
Figure 7C:
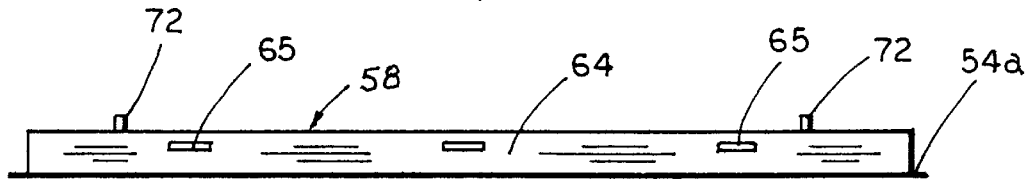
FIG. 7C is a bottom view of the display module of FIG. 7.
Figure 7D:
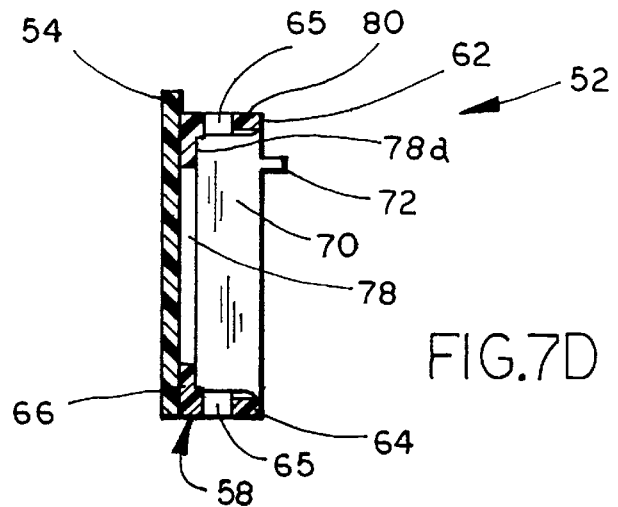
FIG. 7D is a sectional end elevation of the display module taken along line VIID—VIID of FIG. 7A.

As best seen in FIG. 7A, back wall 66 includes a plurality of openings 74, 76, and 78 which expose areas or regions of element 54. Located or formed on those areas of exposed plate 54 are the indicia, such as "on", "off" and "passenger air bag" with its associated icon (FIG. 7). The passenger side air bag on/off signal may be derived from various types of seat occupancy detectors such as by video surveillance of the passenger seat as disclosed in co-pending, commonly-assigned U.S. patent application Ser. No. PCT/US94/01954, filed Feb. 25, 1994, the disclosure of which is hereby incorporated by reference, or by ultrasonic or sonar detection, infrared sensing, pyrodetection, weight detection, or the like. Alternately, enablement/displayment of the passenger side air bag operation can be controlled manually such as through a user operated switch operated with the ignition key of the vehicle in which assembly 10 is mounted as described in co-pending, commonly-assigned U.S. patent application Ser. No. 08/799,734, filed Feb. 12, 1997, now U.S. Pat. No. 5,786,772, the disclosure of which is incorporated by reference herein in its entirety. It should be understood that other indicia may be used and, further, that the size of the areas may be increased or decreased as desired. When mounted to attachment member 18, openings 78, 76, and 74 are aligned with respective light assemblies 90, 92, and 94 of attachment member 18, as will be more fully described in reference to attachment member 18. Extending around each opening 74, 76, and 78 are generally planar landing surfaces 74a, 76a, and 78a, respectively, which are formed by portions of back wall 66. Each landing surface 74a, 76a, and 78a is surrounded by a divider wall 80 which extends between intermediate walls 68 and 70 adjacent upper wall 62 and lower wall 64 and extends between upper wall 62 and lower wall 64 between landing 74a and 76a and between 76a and 78a. In this manner, landing surfaces 74a, 76a, and 78a are recessed below the upper surface of divider wall 80. Wall 80, therefore, provides a barrier between each opening 74, 76, and 78 and substantially reduces, if not prevents, light leakage between the respective light assemblies 90, 92, and 94 so that each indicia can be illuminated without illuminating an adjacent indicia. Preferably, upper and lower walls 62 and 64 include notched surfaces 82, which align with the respective slotted openings 65 to guide the openings onto the corresponding receiving structures on attachment plate 18.

Referring to FIGS. 6 and 6A–6D, attachment member 18 comprises a generally rectangular plate 84 formed from a resinous polymeric material, preferably an ABS, for example GE CYCOLAC AR 2402, available from GE Plastics. Plate 84 includes a first upper planar portion 84a and a second offset portion 84b which is offset rearwardly from reflective element 14. Light assemblies 90, 92, and 94 are formed on offset portion 84b over which display module 52 is mounted to form light module 19. Display module 52 is mounted to attachment member 18 by a plurality of projecting flanges 88, which extend into slotted openings 65 provided in upper and lower side walls 62 and 64 preferably guided by notched surfaces 82. Light assemblies 90, 92, and 94 are formed by an elongated generally rectangular body 100 which projects outwardly from offset portion 84b towards display module 52. Body 100 includes upper, lower, left, and right sides 102, 104, 106, and 108. Recessed into rectangular body 100 are three recessed cavities 110, 112, and 114 which respectively form light assemblies 90, 92, and 94 that direct light from light sources 23 toward display module 52. Light sources 23 are mounted to circuit board 22 (FIG. 6), which in turn is mounted to rear surface 18a of attachment member 18. Each cavity 110, 112, and 114 includes a plurality of openings 118 which align with and through which light sources 23 project light toward display module 52. In the illustrated embodiment, cavity 110 comprises an elongate generally rectangular cavity with six openings, while cavities 112 and 114 each comprise generally rectangular or square cavities having two openings formed therein. Cavities 110, 112, and 114 each include parabolic reflecting surfaces 120, 122, and 124 (FIGS. 6, 6A, 6C, and 6D), respectively, associated with each opening 118 to defuse the light from light sources 23 to provide uniform light across display area 20. It should be understood that the shape and size of the cavities may be varied, and, furthermore, that arrays of light sources may be housed in cavities 110, 112, and 114. In addition, the light from the light sources may be selectively dimmed such the display is dimmed, as would be understood by those skilled in the art. Such dimming of the display may be automatic or may optionally be controlled by an occupant of the vehicle, for example by a dimmer switch.

In preferred form, light sources 23 comprise non-incandescent light sources, for example light emitting diodes (LEDs), which are adapted to provide backlighting of display module 52 when the circuit board 22 is positioned on attachment member 18. A preferred light emitting diode is a NICHIA white light emitting diode available from Nichia Chemical Industries of Tokyo, Japan, under Model Nos. NSPW 300AS, NSPW 500S, NSPW 310AS, NSPW 315AS, NSPW 510S, NSPW 515S, and NSPW WF50S, and provides low level, non-incandescent, white light for illuminating the indicia on display module 52. Optionally, one or more light sources 23 may be connected to operate at all times during the operation of the vehicle so as to continuously illuminate the indicia, for example the words "passenger air bag." The remaining light sources aligned with the words "off" and "on," respectively, and may be individually selectively activated to provide backlighting for those words individually. The light sources behind the status of the air bag, either off (disabled) or on (enabled) are selectively operated.

Alternately, other emitting elements can be used to display information (including alpha-numerical information) such as incandescent displays, vacuum fluorescent displays, electroluminescent displays, field-emission displays, organic polymeric light emitting displays, or cathode ray tube displays. The various displays useful in this invention can also be reconfigurable so that certain critical alpha-numeric or symbolic information, icons or other indicia will override or supplant normal, primary information for a selected period of time such as for a traffic warning, vehicle blind spot presence detection, engine operation change or deficiency, compass heading change, incoming cellular phone call or the like.

Figure 6:
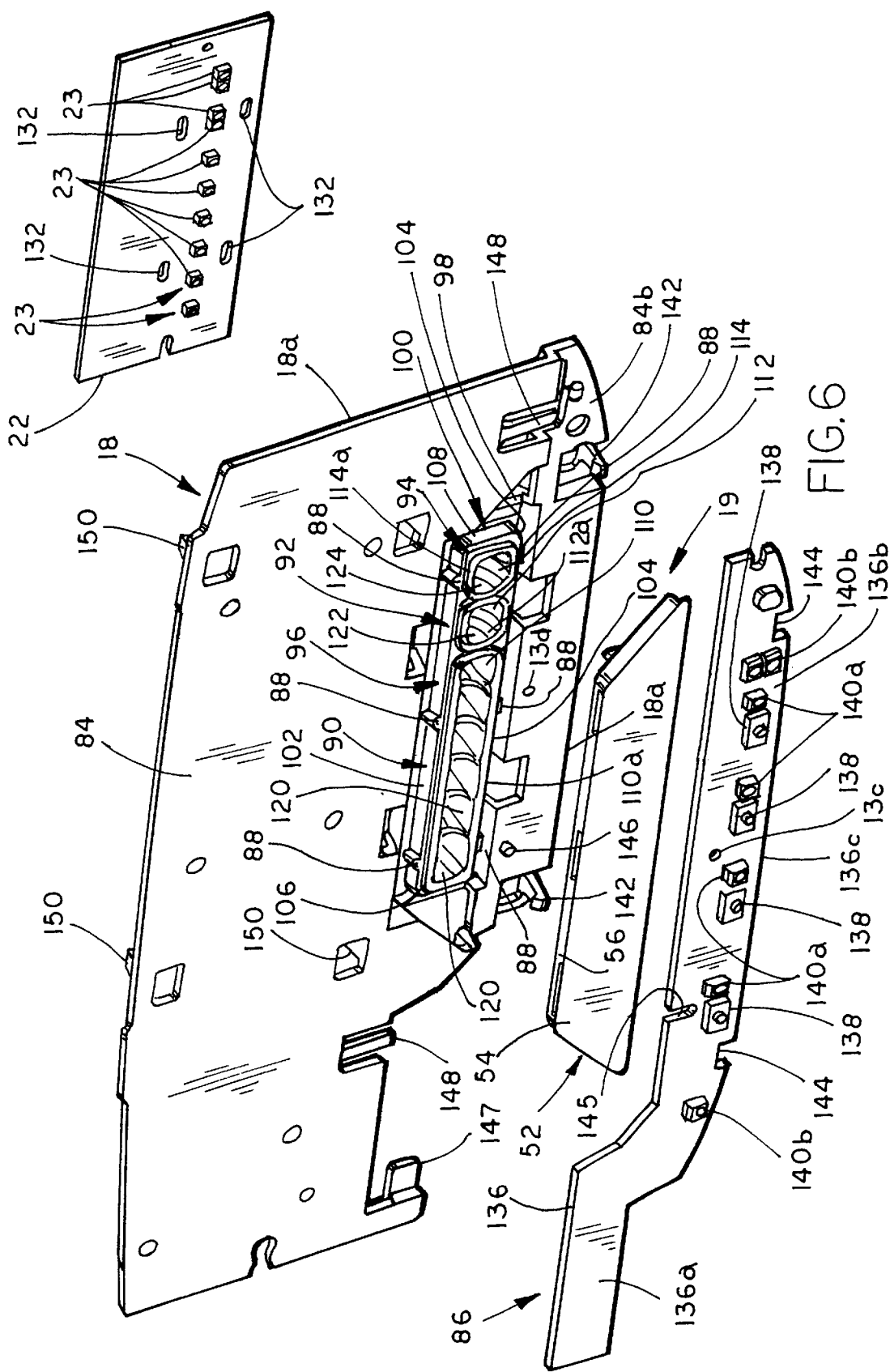
FIG. 6 is an enlarged perspective view of an attachment plate and LED board and switch board of the interior rearview mirror assembly of FIG. 1.
Figure 6A:
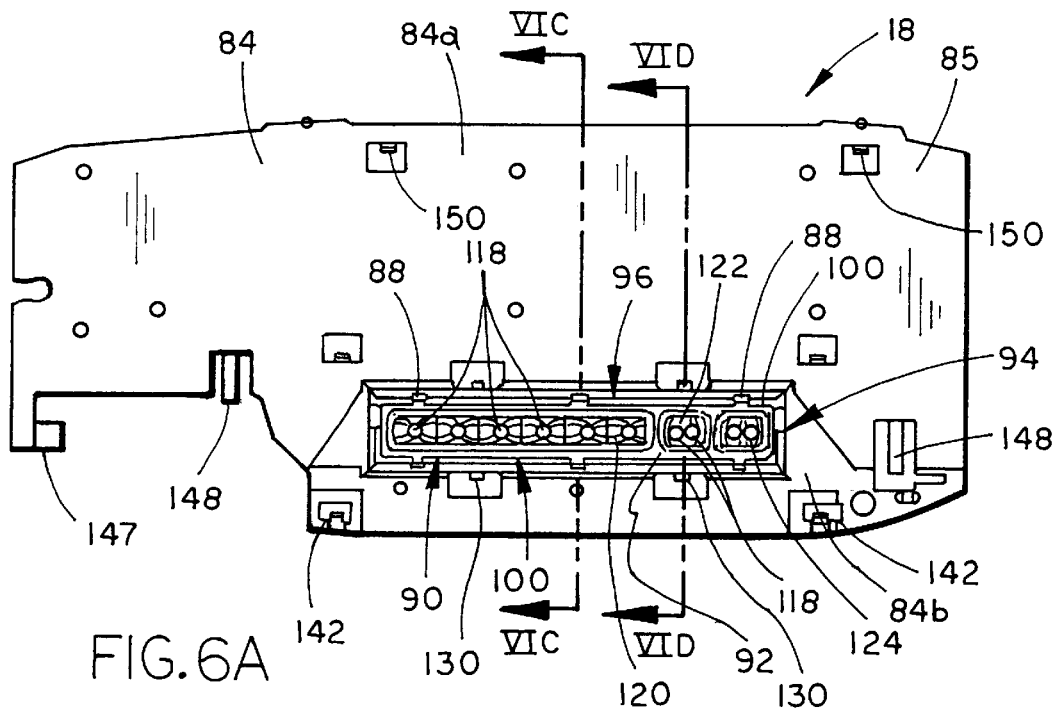
FIG. 6A is a front elevation of the attachment plate of FIG. 6.
Figure 6B:
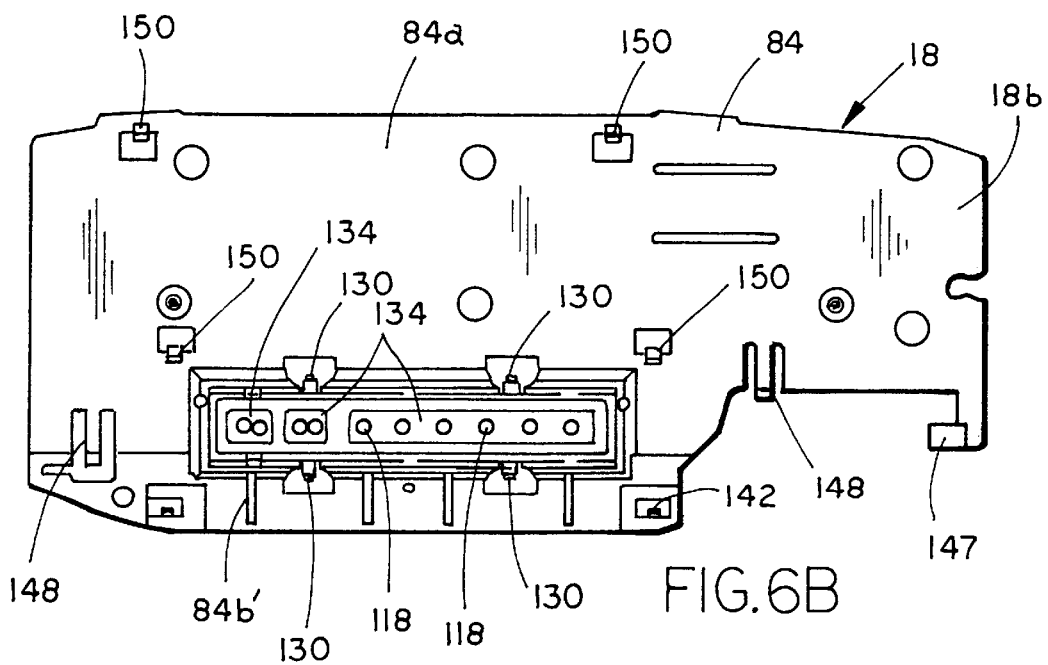
FIG. 6B is a rear elevation of the attachment plate of FIG. 6.
Figures 6C, 6D:
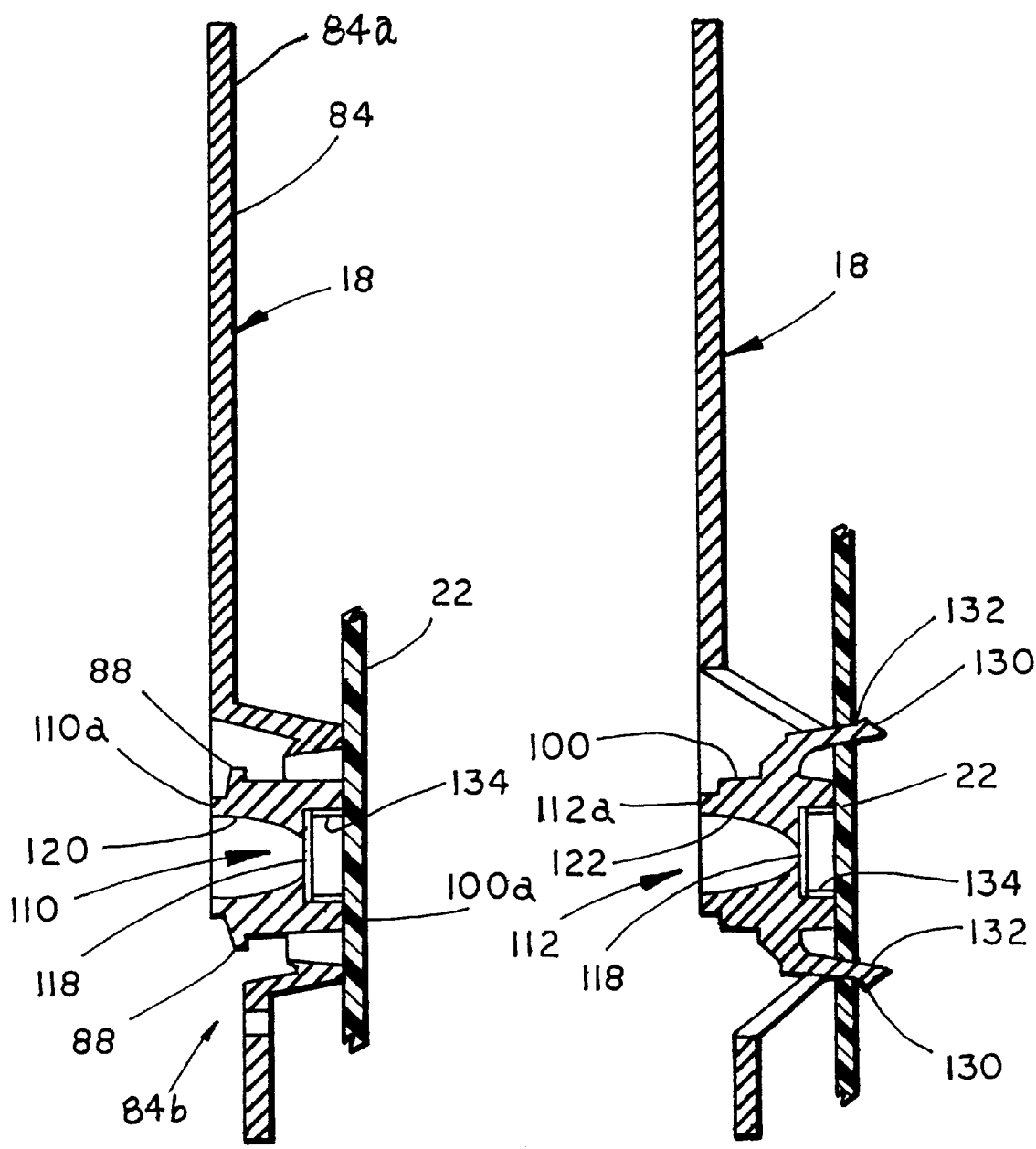
FIG. 6C is a sectional side elevation of the attachment plate taken along line VIC—VIC of FIG. 6A.
FIG. 6D is another sectional side elevation of the attachment plate taken along line VID—VID of FIG. 6A.

Circuit board 22 is mounted on attachment member 18 by rearwardly projecting flexible flanges 130 (FIG. 6B) which extend into corresponding openings 132 provided on circuit board 22 to releasably couple circuit board 22 to attachment member 18 and further to position each light source 23 with a respective opening 118 of cavities 110, 112, and 114. As best seen in FIGS. 6C and 6D, when circuit board 22 is mounted to attachment member 18 by flanges 130, light sources 23 are aligned with openings 118 and further are received in a recesses 134 formed on rear side 100a of block member 100. In this manner, light leakage from the respective light sources is substantially reduced and, more preferably, essentially eliminated.

Referring again to FIG. 6, extending around each cavity 110, 112, and 114 is a projecting perimeter wall 110a, 112a, and 114a, respectively. Perimeter walls 110a, 112a, and 114a align with and are seated on landing surfaces 78a, 76a, and 74a, of display module 52. As best understood from FIG. 3, when circuit board 22 is mounted to attachment member 18 and display module 52 is mounted to attachment member 18 and positioned against rear surface 14b' of second sheet 14b, openings 78a, 76a, and 74a align with respective light assemblies 90, 92, and 94 and light from the respective light sources 23 is directed by the curved reflecting surfaces 120, 122, and 124, preferably compound curved reflecting surfaces, and most preferably parabolic reflecting surfaces to cause the light to be defused and, furthermore, to create substantially uniform light across display area 20 for each respective indicia or group of indicia. In addition, since substantially all the light from each respective light source 23 is directed through openings 118 and each perimeter wall 110a, 112a, and 114a of each respective cavity abuts and substantially seals against the landing surfaces of each respective display area, light leakage between cavities is substantially reduced, if not eliminated. In other words, each light assembly is isolated from adjacent light assemblies. As a result, stray light between the indicia on display module 52 is substantially eliminated. Optionally, perimeter walls 110a, 112a, and 114a may comprise a compressible plastic or resilient material, such as rubber, to enhance the seal between each light assembly 90, 92, and 94 and openings 78a, 76a, and 74a, in which case, manufacturing tolerances on the respective parts may be relaxed.

More preferably, a display module is provided that encompasses at least a light emitting source such as LED source, electroluminescent source, organic polymeric light emitting source, a vacuum fluorescent light source or an incandescent source. The light emitting source of the display module may comprise individual light emitting segments or elements that are arranged to create an indicia when selectively illuminated. The light emitting source can be disposed behind a mask in such a manner such that the mask forms the indicia when the mask is viewed by the observer. Optionally and preferably, the display module includes appropriate display electric drivers and/or connections for illumination of the display and any ancillary mechanical support or packaging.

Also mounted to attachment member 18 and aligned with key pad 16 is a switch board 86, for example a wireless telecommunication interface system, such as an ONSTAR switch board available from General Motors of Detroit, Michigan, for enabling buttons 16a and indicators 16b of key pad 16. As best seen in FIG. 6, switch board 86 includes a plate member 136 with an upper portion 136a and a lower portion 136b that supports a plurality of switches 138 and associated light sources 140a. Each switch 138 and respective light source 140a is aligned with a respective button 16a on key pad 16 (FIG. 2). Switches 138 are preferably pressure activated switches and activate their associated light sources 140a when a respective button 16a on key pad 16 is initially pressed. Similarly, when the respective button 16a on key pad 16 is pressed a second time, its associated switch 138 is deactivated, which in turn deactivates its associated light source 140a. As previously noted, key pad 16 is preferably a resilient material, more preferably a translucent rubber, such as silicone, and may include one or a plurality of buttons (as shown) depending on the desired application. In addition, in the illustrated embodiment, key pad 16 includes indicators 16b which are illuminated by light sources 140b, which are also supported on switch board 86. Light sources 140a and 140b are preferably non-incandescent light sources, such as LEDs, such as previously described in reference to light source 23. Buttons 16a may provide a wide variety of functions, including, for example, functions associated with the wireless telecommunication interface system. Indicators 16b may provide information relating to the activation status of selected functions within the vehicle or mirror assembly.

Referring again to FIG. 6, switch board 86 is mounted to attachment member 18 on flexible flanges 142, located below light module 19 which respectively engage notches 144 provided on a lower edge 136c of portion 136b. In order to assist alignment of switch board 86 on attachment member 18, plate 136 includes an elongated slot or groove 145 for receiving a projecting pin 146 provided on offset portion 84b of attachment member 18. In addition, bezel 13 includes an alignment member 13a which projects inwardly and through openings 13c and 13d provided on switch board 86 and on attachment member 18, respectively (FIG. 3). Furthermore, upper portion 136a of plate 136 seats on a recessed tab 147 provided on first portion 84a of attachment member 18. Tab 147 provides a support and furthermore, provides a guide to assure that switch board 86 is properly aligned on attachment member 18. In addition, attachment member 18 includes a plurality of downwardly extending flexible flanges 148 which engage and apply a spring pressure to releasably hold plate 136 in position on flexible flanges 142.

Mounted to the rear surface 18a of attachment plate 18 is a second circuit board 21. As best seen in FIG. 6B, attachment member 18 includes additional flexible flanges 150 which project rearwardly from rear surface 18a of attachment member 18 to engage corresponding openings provided in circuit board 21 to mount circuit board 21 onto attachment member 18. Circuit board 21 preferably carries EC circuitry, for example EC board 17, for the operation of electro-optic reflective element 14, and circuitry for light sources 23, light assemblies 42, microphone module 44 also housed in case 12, and for various other vehicle and/or mirror functions. For example, circuit board 21 may include electronic and electric devices, including a blind spot detection system, such as the type disclosed in U.S. patent application Ser. No. 08/799,734 entitled "VEHICLE BLIND SPOT DETECTION AND DISPLAY SYSTEM", invented by Schofield et al. and filed Feb. 12, 1997, now U.S. Pat. No. 5,786,772, or rain sensor systems, for example rain sensor systems which include windshield contacting rain sensors such as described in U.S. Pat. No. 4,973,844 entitled "VEHICULAR MOISTURE SENSOR AND MOUNTING APPARATUS THEREFORE", or non-windshield contacting rain sensors, such as described in PCT International Application PCT/US94/05093 entitled "MULTI-FUNCTION LIGHT SENSOR FOR VEHICLE", published as WO 94/27262 on Nov. 24, 1994, the disclosures of which are hereby incorporated by reference herein in their entireties. Also, circuit board 21 may include circuitry for mirror mounted video cameras, which are used to visually detect the presence of moisture on the windshield and actuate windshield wipers accordingly, such as described in copending U.S. application Ser. No. 08/621,863 filed Mar. 25, 1996, entitled "VEHICLE HEADLIGHT CONTROL USING IMAGING SENSOR" by Schofield et al., now U.S. Pat. No. 5,796,094, mirror mounted cameras for vehicle internal cabin monitoring disclosed in U.S. Pat. Nos. 5,877,897 and 5,760,962, both commonly assigned to Donnelly Corporation, which are hereby incorporated herein by reference in their entireties. Other electronic or electrical devices mounted to circuit board 21 may include for example home access transmitters, a high/low or daylight running beam low headlight controller, a hands free cellular phone attachment, a video device such as a video camera for internal cabin surveillance and/or video telephone function, remote keyless entry receiver, a compass, a seat occupancy detector, a trip computer, an intrusion detector and the like. As used in the specification, an electrical device encompasses an electrically operated accessory or device such as a map light or the like. An electronic device encompasses an electronic circuit board or PCB (such as an automatic light dimming circuit board, a compass sensing and directional circuit board or the like) or electron devices or circuits or systems, including electron tubes, amplifiers and transistors and other devices that do the work of electron tubes.

In order to connect the various electrical or electronic devices in case 12 to the vehicle electrical system and on board computers, circuit board 21 includes a connector 21b, such as a 16-pin connector, mounted to rear surface 21a (FIG. 2). When mirror assembly 10 is fully assembled, connector 21b aligns with an access opening 38a provided on back wall 38 of case 12 (FIGS. 4, 4A and 4B) through which connector 21b is then connected to the vehicle electrical system and computer by way of a plug connector and cable. When fully assembled with display module 52, circuit boards 21 and 22., and switch board 86, attachment member 18 is mounted to reflective element 14 preferably by an adhesive, such as silicone adhesive, an acrylic adhesive or the like. Alternatively, attachment member 18 may be mounted to other mounting structures provided in case 12. Furthermore when attachment member is fully assembled and inserted in to case 12, display element 54 of light module 19 and light emitted therefrom are positioned behind reflective element 14 and are aligned with and transmit through the corresponding light transmitting window 21 created in the reflector of reflective element 14 for displaying indicia through window 21 to form display area 20.

The interior rearview mirror assembly may also incorporate a vehicle tracking unit which tracks where a vehicle is located, and is thus useful should the vehicle be stolen, or should the driver need emergency assistance at a remote location whose address is unknown to the driver, similar to an ONSTAR System noted above. Such a system is available from ATX Technologies of San Antonio, Tex. and uses global positioning satellites and cellular communications to pinpoint the location of the vehicle. Assistance can be rendered by the ATX supplied unit (known as an On-Guard Tracker (™) unit) on how to handle emergency situations, direction can be rendered, remote unlocking of door locks can be achieved if the owner's keys are misplaced or locked in the vehicle. Messages (such as email messages, hazard warning messages, vehicle status messages, page messages, etc.) can be displayed at display area 20 or at the interior mirror assembly, where the driver is always regularly looking during the normal driving task. As previously noted and best seen in FIG. 4, case 12 optionally supports a pair of light assemblies 42 and a microphone module 44 in openings 46 and 48 provided or formed in bottom wall 50 of case 12. Light assemblies 42 provide light for the interior of the vehicle and may comprise map lights or dashboard illumination lights. Light assemblies 42 each include a dome-shaped reflector housing 42a with a cover 42b. Reflector housings 42a include mounting tabs 43a which are heat staked onto bosses 160a and pins 160b which project from back wall 38 of case 12 to retain the housing in openings 46 in the mirror case. Reflector housings 42a each include an opening 42c to receive a respective light bulb 158 which projects thereinto from circuit board 21. Reflector housings 142 preferably comprise housings molded from resinous polymeric or plastic material and, more preferably, polycarbonate housings, for example LEXAN 121 and are provided with a reflective coating and, more preferably, are vacuum metalized. In preferred form, light bulbs 158 comprise incandescent bulbs, and are supported by bulb holders 158a which are mounted to rear side 21a of circuit board 21. Bulb holders 158a and bulbs 158 project downwardly and are inclined at an angle such that bulbs 158 extend into reflector housings 42a through openings 42c. Covers 42b preferably comprise transparent lens covers and more preferably optical lens covers preferably formed from polycarbonate or acrylic. For example, covers 42b may include pyramid optics, which hide the light bulb positioned in reflective housing 42a and, furthermore, may include optics to direct light as desired locations in the vehicle. Optionally, covers 42b may comprise clear parabolic lenses. Referring again to FIG. 4, covers 42b are semi-circular shaped with flexible flanges or fingers, for example snap fingers 42d, for engaging bottom wall 50 of case 12. In addition, each cover 42b preferably includes an elongated, L-shaped arm 42e, which can be used to retrieve bulbs 158 from bulb holder 158a when bulbs 158 are no longer functional. Alternatively, non-incandescent light sources may be used in light assemblies 42. For example, a cluster of a plurality of at least four, more preferably at least six LEDs may be used, which most preferably direct white light to a targeted area. Light assemblies 42 may include a variety of emitting sources such as high intensity amber and reddish orange light emitting diode sources, such as solid state light emitting diode LED sources utilizing double hydro junction AIGaAs/GaAs Material Technology such as very high intensity red LED lamps T/1¾ (5 mm) HLMP-4100/4101 available from Hewlett Packard Corporation of Pallo Alto, Calif., or transparent substrate aluminum indium gallium phosphide (AlInGaP) Material Technology, commercially available from Hewlett Packard Corporation, of Pallo Alto, Calif. Also, blue or white LEDs can be used or a combination of individual different colored diodes can be used with the color mixing thereform to form a desired color. Optionally, a plurality of LEDs such as a cluster of four, six, eight or the like LEDs can be used to target and illuminate a local area for higher illumination at that area, such as may be useful in a map light (most preferably illuminating the target area with white light).

Light assemblies 42 are actuated by switches 162 which are also preferably mounted to circuit board 21. Switches 162 include buttons 162a which extend downwardly from circuit board 21 and are angled to extend through bottom wall 50 of case 12. In the illustrated embodiment, bottom wall 50 includes semicircular notches 164a along the perimeter of openings 46. In addition, covers 42b each include a corresponding semicircular notch 164b which together with notches 164a form opening through which buttons 162a extend for easy access by an occupant of the vehicle at the bottom surface of case 12. Examples of other light assemblies, such as map lights or the like, which may be incorporated into case 12 are described in commonly assigned, U.S. Pat. Nos. 5,669,698; 5,820,245; 5,671,996; 5,813,745; 5,178,448; 4,733,336; and 4,646,210; the disclosures of all of which are herein incorporated in their entireties.

Microphone module 44 preferably comprises a microphone module described in commonly assigned, copending application Ser. No. 09/382,720 entitled "ACCESSORY MODULE FOR VEHICLE", filed by Jonathan E. DeLine and Niall R. Lynam on Aug. 25, 1999, now U.S. Pat. No. 6,000,823, the disclosure of which is incorporated by reference herein. Microphone module 44 includes at least one microphone (not shown) which is supported in a microphone housing 44a. Housing 44a is positioned in opening 48 of bottom wall 50 of casing 12 and is held in place by flexible flanges 48a which engage housing 44a, as will be understood by those skilled in the art. Microphone module 44 is electrically connected to a microphone connector 44d supported on circuit board 22 by pair of lead wires 44c. Microphone module 44 or a plurality of microphone modules optionally provide hands-free input to a wireless telecommunication system such as the ONSTAR™ system in use in General Motors vehicles. Most preferably such microphones provide input to an audio system that transmits and communicates wirelessly with a remote transceiver, preferably in voice recognition mode. Such systems are described in U.S. patent application Ser. No. 09/382,720, filed Aug. 25, 1999, now U.S. Pat. No. 6,000,823, the disclosure of which is hereby incorporated by reference herein.

In this regard it may be desirable to use audio processing techniques such as digital sound processing to ensure that vocal inputs to the vehicular audio system are clearly distinguished from cabin ambient noise such as from wind noise, HVAC, and the like. Also, noise cancellation techniques such as destructive interference can advantageously be used, whereby the signal as picked up by the microphone is processed, the human vocal signal is distinguished from the noise signal, and whereby the noise signal is fed back 180 degrees out of phase with itself in order to cancel out the noise by destructive interference and so enhance the vocal signal to background noise ratio.

Preferably the microphone interfaces to an audio system that includes an analog to digital converter and/or a digital to analog converter for the purpose of converting the analog output of the microphone to a digital signal for input to a digital sound processor and for conversion of the digital output of a digital sound processor to an analog signal for wireless transmission to a remote transceiver. Digital sound processing techniques may be used to enhance the vocal signal to background noise discrimination ratio. Also, both analog and digital audio filtering techniques can be used to enhance the vocal to background noise ratio, and so assist clarity of transmission and/or receipt at a remote receiver and so improve accuracy in voice recognition mode. Also, physical techniques such as sound insulation, acoustic wave guides, angling of microphones to selectively detect speech versus background noise, use of a directed microphone directed to a potential human speaker in conjunction with a more omnidirectional microphone intended to detect background noise can be used. An adaptive signal processing system can be used to enhance vocal to noise ratio. Mechanical cancellation of ambient noise can be provided, as can a noise canceling pressure gradient microphone, preferably in conjunction with acoustic ports including voice and noise ports. Such a system is disclosed in World Patent publication WO 9817046 to D. Andrea of Apr. 23, 1998, the disclosure of which is hereby incorporated by reference.

In this manner, all the electronics and electrical devices, with the exception of the optional microphone module 44, may be supported, formed, and/or housed on attachment member 18. Thus, mirror assembly 10 can be quickly and easily assembled, with attachment member 18 forming a carrier member, cartridge or modular unit/assembly which can be quickly inserted into the cavity 12a of casing 12. Optionally, when mounted to attachment member 18, display module 52 and switch board 86 are adapted to align in a common plane with upper planar portion 84a of plate member 84. In a similar manner, circuit board 22 is preferably generally aligned in a common plane with circuit board 21 so that when fully assembled attachment member 18 has a relatively compact and slim profile.

Additionally, the interior mirror assembly may include a variety of information displays such as a PSIR (Passenger Side Inflatable Restraint) display, an SIR (Side-Airbag Inflatable Restraint), compass/temperature display, a tire pressure status display or other desirable displays, such as those described in U.S. patent application Ser. No. 09/244,726, filed Feb. 5, 1999, now U.S. Pat. No. 6,172,613, the disclosure of which is hereby incorporated by reference herein.

For example, the interior rearview mirror assembly may include a display of the speed limit applicable to the location where the vehicle is travelling. Conventionally, speed limits are posted as a fixed limit (for example, 45 MPH) that is read by the vehicle driver upon passing a sign. As an improvement to this, an information display (preferably an alphanumerical display and more preferably, a reconfigurable display) can be provided within the vehicle cabin, readable by the driver, that displays the speed limit at whatever location on the road/highway the vehicle actually is at any moment. For example, existing speed limit signs could be enhanced to include a transmitter that broadcasts a local speed limit signal, such signal being received by an in-vehicle receiver and displayed to the driver. The speed limit signal can be transmitted by a variety of wireless transmission methods, such as radio transmission, and such systems can benefit from wireless transmission protocols and standards, such as the BLUETOOTH low-cost, low-power radio based cable replacement or wireless link based on short-range radio-based technology. BLUETOOTH enables creation of a short-range (typically 30 feet or so although longer and shorter ranges are possible), wireless personal area network via small radio transmitters built into various devices. For example, transmission can be on a 2.45 gigahertz band, moving data at about 721 kilobits per second, or faster. BLUETOOTH, and similar systems, allow creation of an in-vehicle area network. Conventionally, features and accessories in the vehicle or wired together. Thus, for example, an interior electrochromic mirror and an exterior electrochromic mirror is connected by at least one wire in order to transmit control signal and the like. With BLUETOOTH and similar systems, control commands can be broadcast between the interior mirror and the exterior mirror (and vice versa) without the need for physical wiring interconnecting the two. Likewise, the two exterior mirror assemblies on the vehicle can exchange, transmit and/or receive control commands/signals (such as of memory position or the like such as is described in U.S. Pat. No. 5,798,575, the disclosure of which is hereby incorporated by reference herein) via an in-vehicle short-range radio local network such as BLUETOOTH. Similarly, tire pressure sensors in the wheels can transmit via BLUETOOTH to a receiver in the interior mirror assembly, and tire pressure status can be displayed, preferably at the interior rearview mirror. In the case of the dynamic speed limit system described above, preferably, the in-vehicle receiver is located at and/or the display of local speed limit is displayed at the interior mirror assembly (for example, a speed limit display can be located in a chin or eyebrow portion of the mirror case, such as in the mirror reflector itself, such as in the cover 40, or such as in a pod attached to the interior mirror assembly). More preferably, the actual speed of the vehicle can be displayed simultaneously with and beside the local speed limit in-vehicle display and/or the difference or excess thereto can be displayed. Optionally, the wireless-based speed limit transmission system. can actually control the speed at which a subject vehicle travels in a certain location (such as by controlling an engine governor or the like). Thus, a school zone speed limit can be enforced by transmission of a speed-limiting signal into the vehicle. Likewise, different classes of vehicles can be set for different speed limits for the same stretch of highway. The system may also require driver identification and then set individual speed limits for individual drivers reflecting their skill level, age, driving record and the like. Moreover, a global positioning system (GPS) can be used to locate a specific vehicle, calculate its velocity on the highway, verify what the allowed speed limit is at that specific moment on that specific stretch of highway, transmit that specific speed limit to the vehicle for display (preferably at the interior rearview mirror that the driver constantly looks at as part of the driving task) and optionally alert the driver or retard the driver's ability to exceed the speed limit as deemed appropriate. A short-range, local communication system such as envisaged in the BLUETOOTH protocol finds broad utility in vehicular applications, and particularly where information is to be displayed at the interior mirror assembly, or where a microphone or user-interface (such as buttons to connect/ interact with a remote wireless receiver) is to be located at the interior (or exterior) rearview mirror assembly. For example, a train approaching a railway crossing may transmit a wireless signal such as a radio signal (using the BLUETOOTH protocol or another protocol) and that signal may be received by and/or displayed at the interior rearview mirror assembly (or the exterior sideview mirror assembly). Also, the interior rearview mirror and/or the exterior side view mirrors can function as transceivers/display locations/ interface locations for intelligent vehicle highway systems, using protocols such as the BLUETOOTH protocol. Protocols such as BLUETOOTH, as known in the telecommunications art, can facilitate voice/data, voice over data, digital and analogue communication and vehicle/external wireless connectivity, preferably using the interior and/or exterior mirror assemblies as transceiver/display/user-interaction sites. Electronic accessories to achieve the above can be accommodated in casing 12, and/or elsewhere in the interior mirror assembly (such as in the housing disclosed in U.S. patent application Ser. No. 09/433,467 (Attorney Docket No. P-783) filed Nov. 4, 1999 titled "Vehicle Interior Mirror Assembly" to Patrick Heslin and Niall R. Lynam.

Figure 8:
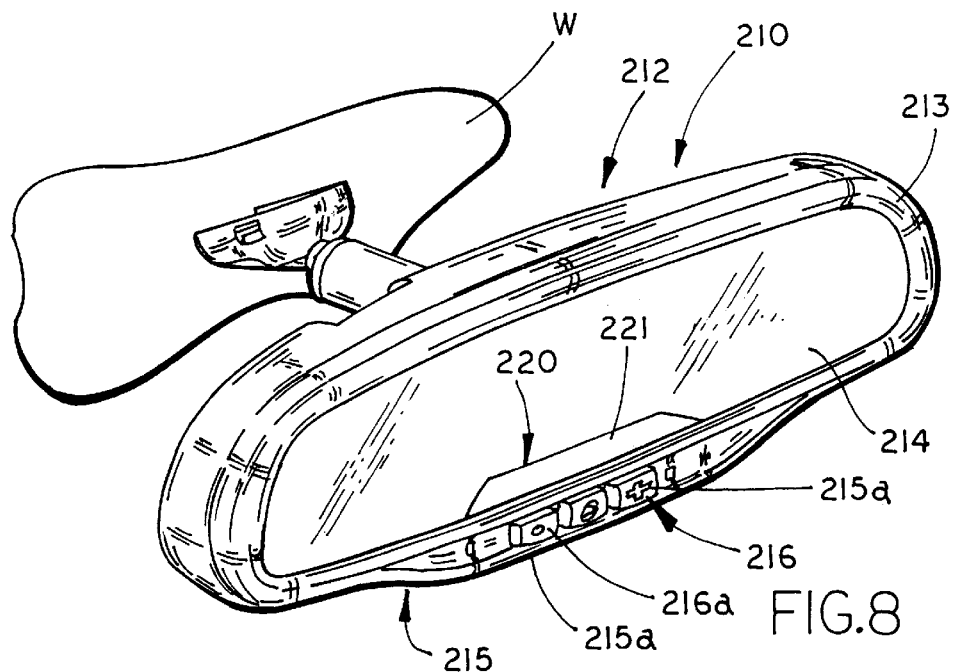
FIG. 8 is a front perspective view of a second embodiment of the interior rearview mirror assembly of the present invention showing the interior rearview mirror assembly in a viewing position on a front windshield of a vehicle.
Figure 9:
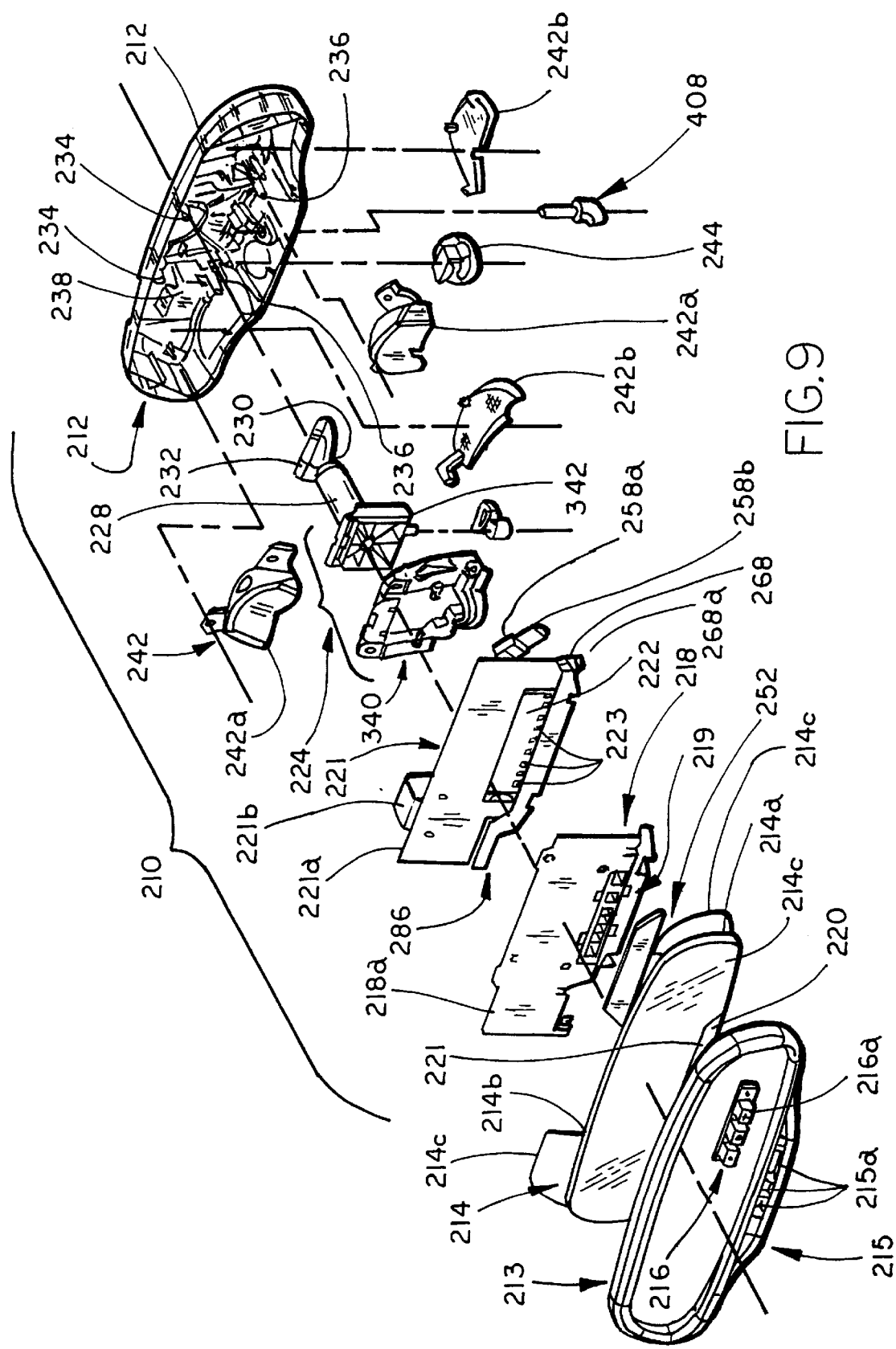
FIG. 9 is an exploded perspective view of the interior rearview mirror assembly of FIG. 8.

Referring to FIG. 8, a second embodiment 210 of the interior rearview mirror assembly of the present invention is illustrated. Mirror assembly 210 includes a mirror case 212, a bezel 213, a reflective element 214 which is supported in case 212 by bezel 213, and an actuator 224. Similar to the first embodiment, reflective element 214 includes a window 221 which provides a display area 220 preferably positioned at a lower central edge of element 214 and a light module 219 (FIGS. 9 and 13). Bezel 213 includes an enlarged chin area 215 as in embodiment 10 with a plurality of transverse openings 215a therethrough for receiving a user actuatable interface, including user actuator buttons 216a. Buttons 216a are preferably formed on a key pad 216. Similar to the first embodiment, key pad 216 preferably comprises a resilient translucent material, such as silicone rubber, and includes a plurality of buttons 216a, with each button preferably being translucent and optionally including indicia formed thereon to provide an indication of the function for the respective button. In the illustrated embodiment, key pad 216 includes three buttons. Alternatively, key pad 216 may include a single button or a plurality of buttons, less than or greater than three, including indicators, as previously described in reference to the first embodiment.

Figure 10:
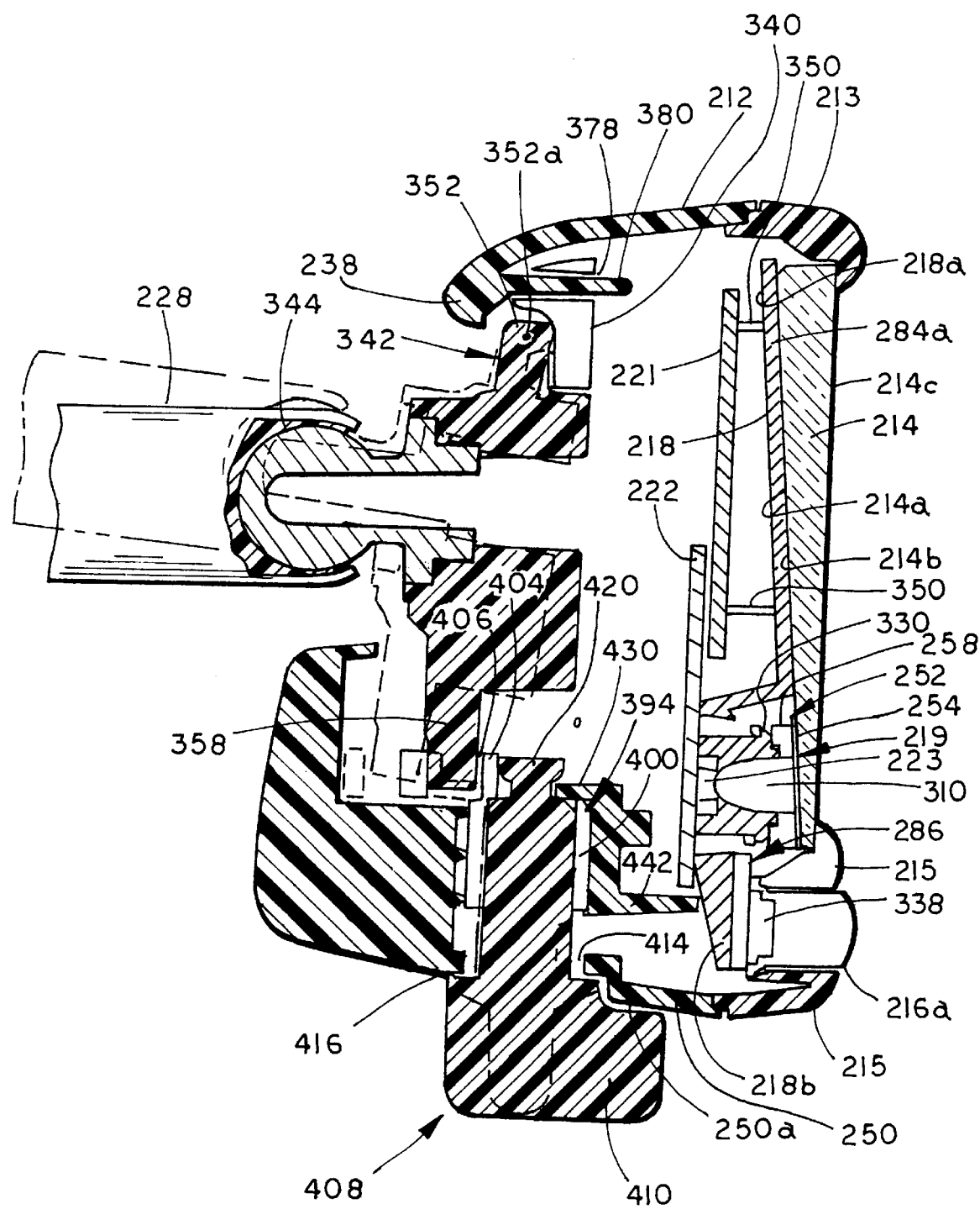
FIG. 10 is a sectional end elevation of the mirror assembly of FIG. 8 taken along line X—X of FIG. 8.
Figure 13A:
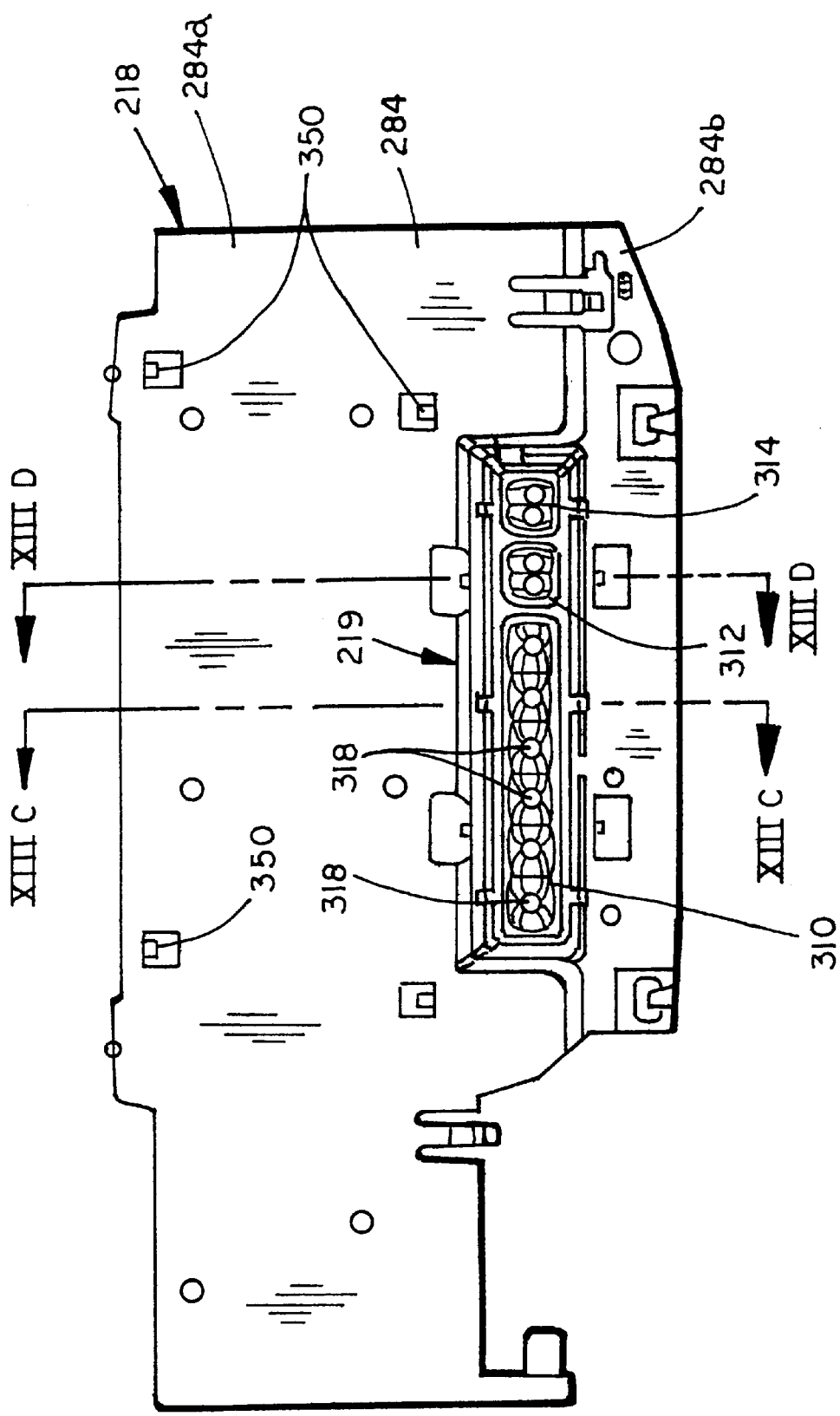
FIG. 13A is a front elevation of the attachment plate of FIG. 13.
Figure 13B:
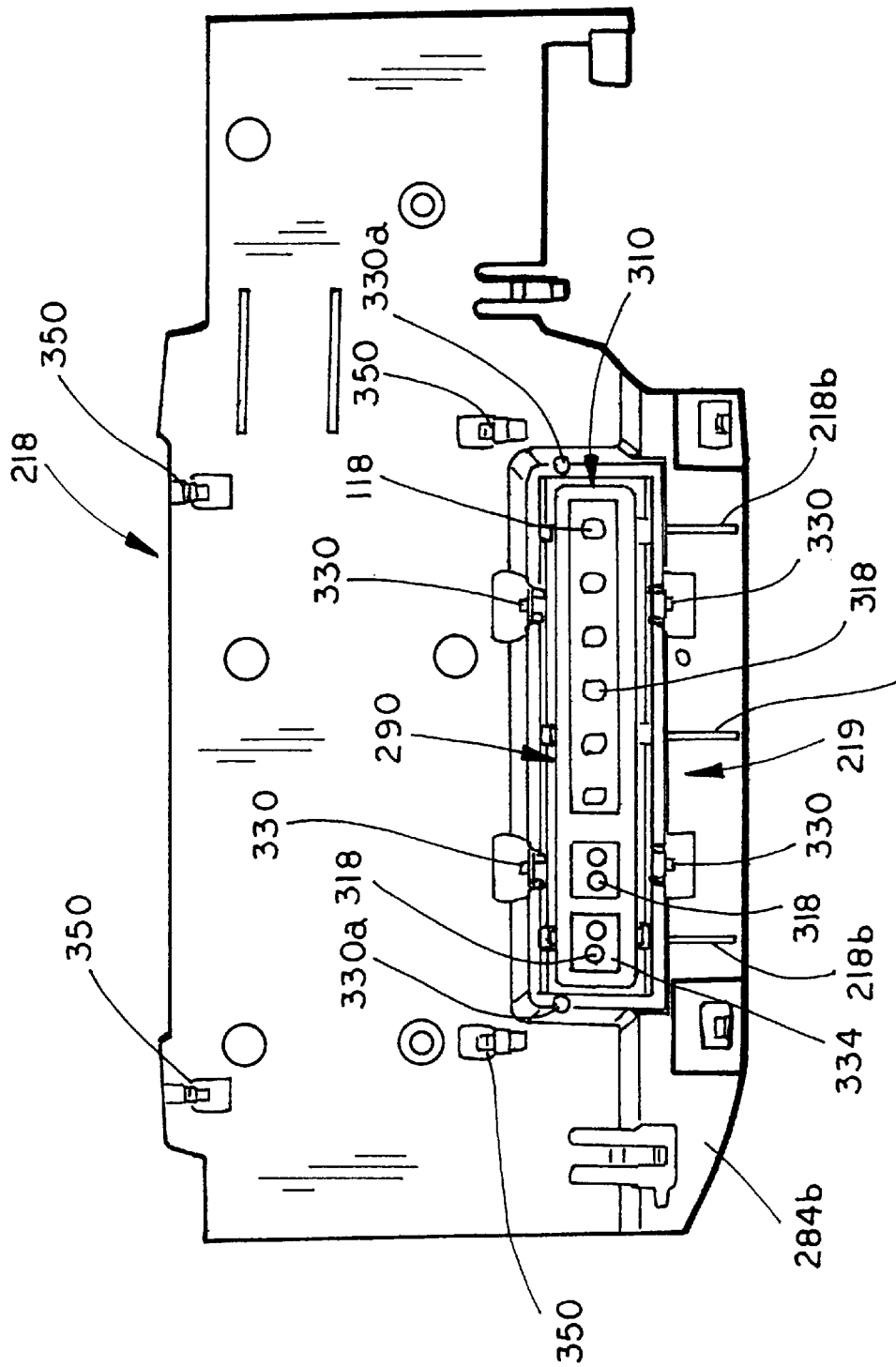
FIG. 13B is a rear elevation of the attachment plate of FIG. 13A.
Figure 13C:
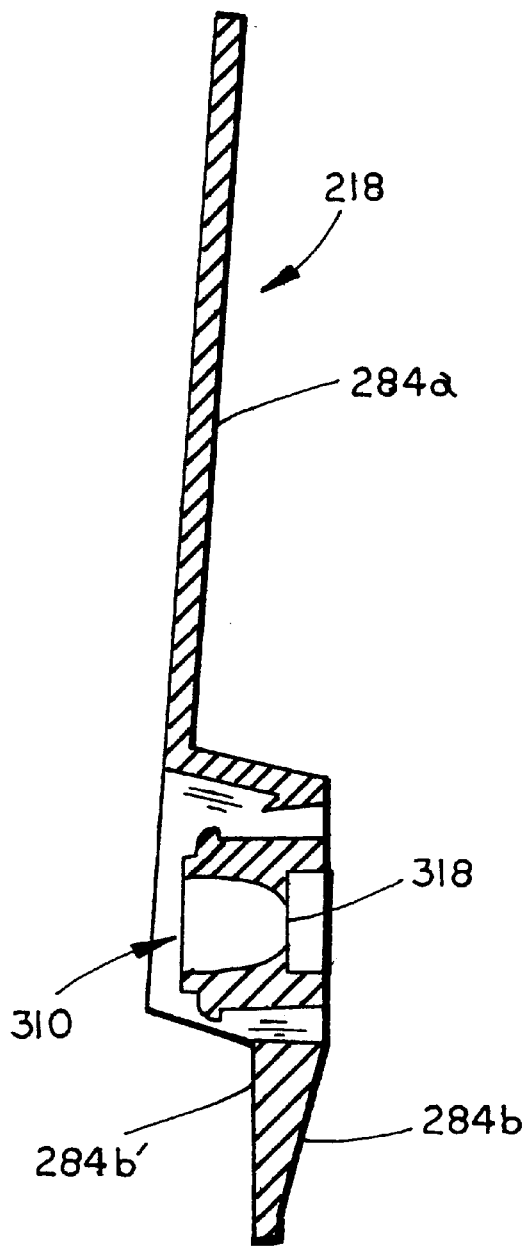
FIG. 13C is a sectional end elevation of the attachment plate taken along line XIIIC—XIIIC of FIG. 13
Figure 13D:
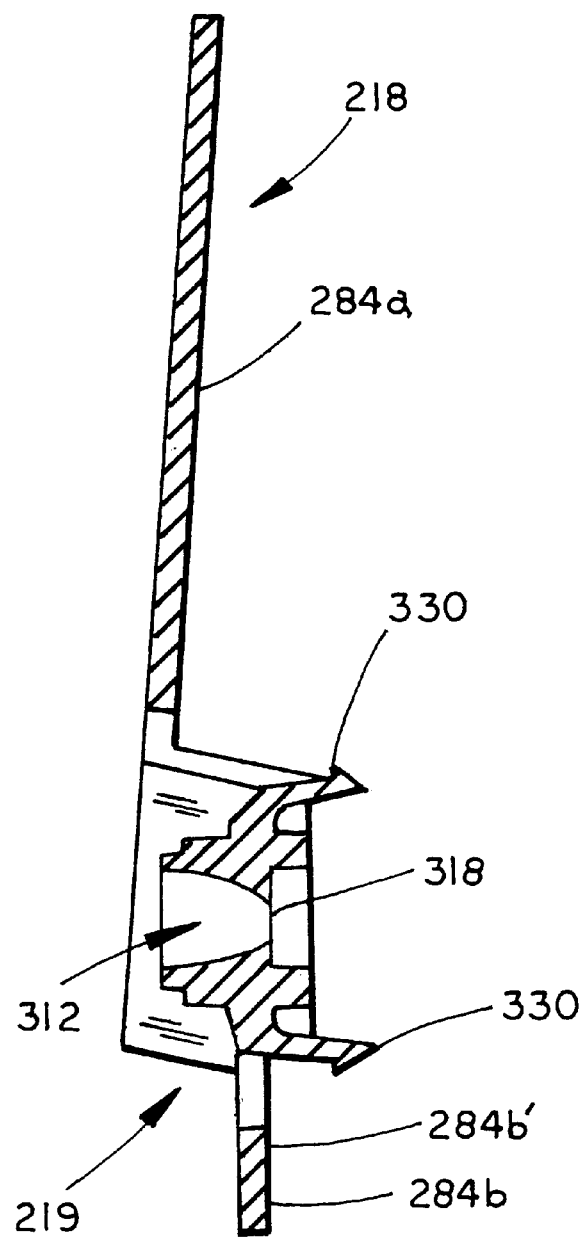
FIG. 13D is another sectional end elevation of the attachment plate taken along line XIIID—XIIID of FIG. 13A.

Referring to FIGS. 9 and 10, reflective element 214 comprises a prismatic reflective element having a wedge shaped cross section. As will be more fully described in reference to actuator 224, rotation of a knob 408 (FIG. 10) pivots mirror case 12, including bezel 13 and reflective mirror element 14, about a pivot axis 352a (FIG. 10) thereby changing the position of the prismatic mirror element from a high reflectivity day viewing position in which incident light is reflected to the user's eye from the highly reflective surface 214a on rear surface 214b of reflective element 214 to a reduced reflectivity or partial reflectance night viewing position in which a reduced amount of the incident light on mirror element 214 is reflected from the uncoated front surface 214c of reflective mirror element 214.

Mounted to rear surface 214b of reflective element 214 is an attachment member 218. Similar to the previous embodiment, attachment member 218 includes a light module 219 which displays or illuminates indicia (FIG. 15) on a display module 252, which can be viewed through window 221 of reflective mirror element 214. Mounted to rear surface 218a of attachment member 218 are first and second circuit boards 221 and 222, which may support various electrical and electronic devices, described previously in reference to the first embodiment and below. Also mounted to attachment member 218 below display module 252 is a switch board 286, which includes a plurality of switches and light sources, preferably LEDs, associated with each respective button 216a on key pad 216, in a similar manner to the previous embodiment. Optionally positioned in case 212 are a pair of light modules 242 and a microphone module 244. Reference is made to the first embodiment for further details of the assembly and mounting arrangements of light assemblies 242 and microphone module 244.

Referring to FIG. 13, attachment member 218 includes a resinous polymeric plate member 284 with upper and lower portions 284a and 284b, with portion 284b being offset from portion 284a rearwardly from reflective element 214. As best seen in FIGS. 13C and 13D, upper portion 284a forms an acute angle with respect to front surface 284b' of lower portion 284b so that when attachment member 218 is mounted onto rear surface 214b of prismatic reflective element 214a, display module 252 and switch board 286 will be properly oriented with respect to window 221 and key pad 216, which can be appreciated more fully by reference to FIG. 10.

Referring again to FIG. 13, light module 219 includes a generally elongate rectangular body 300, which defines upper, lower, and left and right sides 302, 304, 306, and 308, respectively. Recessed in body 300 in a similar manner to the previous embodiment, are a plurality of cavities 310, 312, and 314. Extending around each cavity is a perimeter wall 310a, 312a, and 314a, respectively, for resting on respective recessed landing surfaces 278a, 276a, and 274a of display module 252, similar to the previous embodiment (FIGS. 15A and 15B). Display module 252 includes a display element 254 and a carrier member or frame 258 which is mounted to rear surface 254a of element 254 (FIG. 15B). Frame 258 includes a base wall 266 and a perimeter wall 206 which defines upper, lower, and side walls 262, 264, 263a, and 263b, respectively. Base wall 266 includes a plurality of openings 274, 276, and 278, thus exposing discrete regions or areas of element 254 on which the indicia are located. In this manner, when display module 252 is mounted to attachment plate 218 on projecting flanges or snap fingers 288, openings 278, 276, 274 align with cavities 310, 312, and 314, respectively. Furthermore, since perimeter walls 310a, 312a, and 314a rest on recessed landing surfaces 278a, 276a and 274a, respectively, light leakage is substantially reduced between the respective portions of display area 20. Similar to the previous embodiment, upper and lower walls 262 and 264 include a plurality of elongate slots or openings 265 for receiving snap fingers 288 therein for releasably securing display module 252 to attachment member 218.

Mounted to rear surface 218a of attachment member 218 is circuit board 222 (FIG. 13), which carries a plurality of light sources 223, with each light source being associated with a respective opening 318 of cavities 310, 312, and 314, similar to the previous embodiment. Thus, when circuit board 222 is mounted to rear surface 218a of attachment member 218 on flexible flanges 330, which project rearwardly from offset portion 284 above and below light module 219, light sources 223 are positioned in respective recesses 334 formed on rear surface of body 310. In order to ease alignment of circuit board 222 on attachment plate 218, circuit board 222 includes a slotted groove 222a and a transverse opening 222b, which respectively align with guide pins 330a, which project rearwardly from offset portion 284b.

Switch board 286 is mounted below display module 252 on attachment member 218 (FIGS. 9 and 10) by way of flexible flanges 342 which project outwardly from lower portion 284b and downwardly extending flexible flanges 348 provided on upper portion 284a of plate 284. Preferably, plate 284 includes a recessed tab 347 offset from the plane of plate upper portion 284a similar to attachment plate 18, which provides a seat for switch board 286.

Referring again to FIG. 9, circuit board 221, which mounts onto attachment member 218 via flexible flanges 350 projecting rearwardly therefrom (FIG. 13B), supports a connector 221b on its rear surface 221a, for example a 16-pin connector, for connecting to the vehicle electrical system and on board computer just as in embodiment 10. In addition, mounted to circuit board 221 are a pair of bulb holders 258a, which support bulbs 258b downwardly and at an angle for illuminating light assemblies 242 in a similar manner to the first embodiment. Circuit board 221 also supports a pair of switches 268 with buttons 268a for actuating light assemblies 242 also similar to the previous embodiment. When fully assembled as shown in FIG. 10, attachment member 218 includes light module 219, switch board 286, circuit boards 221 and 222 and is adhered to rear surface 214b of reflective element 214 such that display module 252 aligns with window 221 and the switches on switch board 286 align with respective buttons 216a on key pad 216. As such, attachment member 218 forms a unitary assembly and inserts into mirror assembly 210 like a cartridge. Referring again to FIG. 13B, attachment plate 218 preferably includes a plurality of reinforcing ribs 218b on offset portion 284b of plate 284. Ribs 218b provide reinforcement for lower portion of offset portion 284b, which supports switch board 286. Furthermore, as best seen in FIG. 10, an outer bracket 340 of actuator 224 optionally includes a projecting flange 442 (also shown in FIG. 14) which engages central rib 218b' to provide further support for attachment plate 218.

Referring to FIGS. 9, 14, and 14A–14H, mirror case 212 is mounted on support arm 228 by actuator 224. Actuator 224 pivots case 212 between a day time high reflectance viewing position and a night time reduced reflectance viewing position. Actuator 224 includes an outer actuator bracket 340 and an inner actuator bracket 342. Referring to FIGS. 14E and 14F, inner bracket 342 includes a ball mount 344 which is engaged by support 228, similar to the previous embodiment. Ball mount 344 may include a transverse opening 344a extending therethrough to provide an alternate or additional route for wiring to pass into mirror case 212. Support arm 228 receives a ball mount 230 from a mirror mount 232, which preferably comprises a break-away mount and attaches to a windshield mirror mount button or to a headliner, as is known in the art. Ball mount 344 preferably comprises a zinc die-cast ball mount which is insert molded with body 346 of inner bracket 342. Body 346 includes a generally planar base member 348 with a reinforced collar 350 in which ball mount 344 is insert molded. Bracket 342 also includes a pivot member 352 which is spaced from body 348 by arms 354 and 355, which define therebetween spaced openings 356. Projecting downwardly from body 346 is a guide member 358, preferably a cylindrical pin, which imparts the pivotal movement to case 212 as will be more fully described below.

Referring to FIG. 14E, body 348 is reinforced by a first plurality of webs 360a arranged around the perimeter 362 of body 348 and a second plurality of radial webs 360b which terminate at a cylindrical web 364, which is aligned along a central axis 365 that extends through the center of collar 350 and ball mount 344. Transverse opening 344a is preferably aligned with collar 350 to define a passage through ball mount 344 inner bracket 342. It should be understood that body 348 may also comprise a solid body with a transverse opening for aligning with opening 344a.

Referring again to FIG. 14, outer bracket 340 includes an upper wall 366, a lower wall 368, and opposed side walls 370 which define a central opening 372 in which inner bracket 342 is positioned. Upper wall 366 includes an E-shaped recess 374 which defines a pair of projecting flanges 376. Spaced above recess 374 is a slotted opening 378, which is used to position outer bracket onto back wall 238 of case 212 by aligning with a projecting flange 380 provided on back wall 238 of case 212 (FIG. 10). Also provided along side walls 370 are a pair of projecting tabs or flanges 382 which respectively include slotted openings 384 for aligning with projecting flanges 386 also provided on back wall 238 of case 12 (FIG. 11). As previously noted, outer bracket 340 is heat staked onto mounting bosses 234 and 236, which are received in openings 388 provided at the opposed corners of bracket 340. Similar to the previous embodiments, bracket 340 is also heat staked onto flanges 380 and 386. Optionally, one of the openings 388a may be enlarged to ease assembly.

As best seen in FIG. 10, outer bracket 340 is mounted on pivot member 352 which is received in recess 374 on flanges 376, with flanges 376 extending into openings 356 of inner bracket 342. Thus, outer bracket 340 is pivotally mounted on inner bracket 342 on pivot member 352 about a pivot axis 352a. In addition, with inner bracket 342 being positioned in central opening 372 between side walls 370 and flanges 376 extending into openings 356, inner bracket 342 acts a stop to limit lateral movement of outer bracket 340 and, therefore, mirror case 212 with respect to support 228. Referring to FIGS. 14 and 14a, bottom wall 368 of outer bracket 340 includes a semi-circular offset wall portion 390, which defines an elongated passage or opening 392 for receiving a cam member 394. Semi-circular wall portion 390 is preferably reinforced by upper and lower flanges 396a and 396b. Upper reinforcing flange 396a also supports a pin 398, which will be more fully described below.

Figures 14I, 14J:
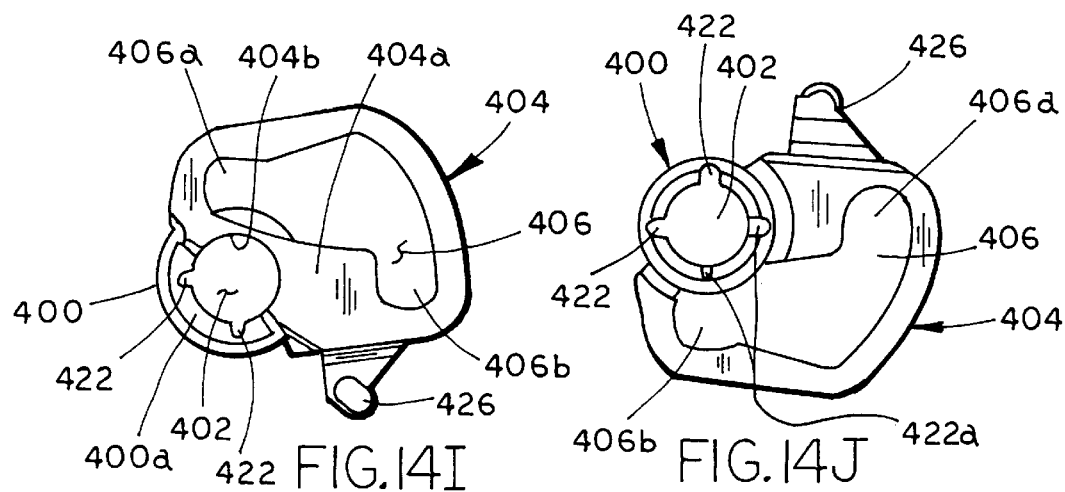
FIG. 14I is an enlarged top plan view of an actuator cam of the actuator assembly of FIG. 14.
FIG. 14J is a bottom plan view of the actuator cam of FIG. 14I.

Cam member 394 includes a body with a first cylindrical portion 400 defining a transverse passage 402 therethrough, and a second cylindrical body portion 404 which similarly includes a transverse passage 406 extending therethrough. Transverse passage 406 defines a guide path for cam member 394 (FIGS. 14I and 14J) when actuator handle 408 is rotated, as will be more fully described below. First cylindrical portion 400 is seated in opening 392 of lower wall 368 of outer bracket 340, while second portion 404 is positioned above reinforcing flange 396a for receiving pin 358 of inner bracket 340 in passage 406. As best seen in FIGS. 14M and 14N, when seated in passage 406, pin 358 is held between the parallel side walls forming passage 406 which further reduces the lateral movement between outer bracket and inner bracket but in a direction that is generally orthogonal to the lateral restraint provided between inner bracket 342 and sides walls 370 to thereby further enhance the stability of the mirror case 12 on bracket 342.

Figure 14K:
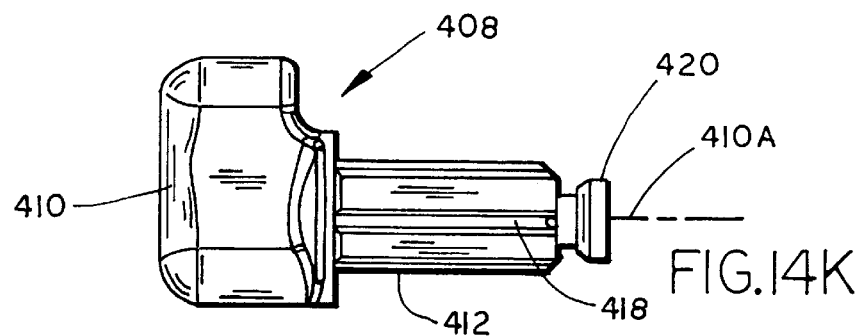
FIG. 14K is a side elevation of the actuator knob of the actuator assembly of FIG. 14.

As shown in FIG. 10, first cylindrical portion 400 is held in opening 392 by handle 408 and wedge-shaped flange 430. Handle 408 includes a knob portion 410 and a shaft 412. Shaft 412 of handle 402 extends through an opening 414 provided in bottom wall 250 of case 212 and into passage 402. As best seen in FIGS. 14K and 14L, knob 410 includes a flange 416 which bears against outer surface 250a of bottom wall 250 and further provides a stop for handle 408. Shaft 412 includes a plurality of longitudinally extending ribs 418 and, further, an enlarged end or retaining head 420 which is defined at the distal end of shaft 412. Ribs 418 engage corresponding grooves 422 provided in passageway 402 so that rotation of knob portion 410 imparts rotation of cam member 394. Grooves 422a terminate at cylindrical portion 404, which overlays cylindrical body 400. In this manner, enlarged side wall portion 404a of cylindrical body 404 provides a stop for shaft 412 within passage 402. When positioned in passageway 402, each respective rib 418 is aligned in its respective groove and further, enlarged end 420 projects above upper surface 400a (See FIG. 10). Enlarged end 420 provides a bearing surface for semi-circular portion 404b of cylindrical body 404 and, further, provides a stop for knob 408. When cylindrical portion 400 of actuator cam 394 is positioned in opening 392 of outer bracket 224, enlarged end 420 is axially restrained in transverse passage 402 by a wedge-shaped stop 424 (FIG. 14) formed or provided on upper flange 396a of bottom wall 368. Wedge-shaped stop 424 also provides stops for cylindrical portion 404 of actuator cam member 394 which define day and night viewing positions for cam member 394, as will be more fully described below.

As previously noted, pin 358 of inner bracket 342 extends into passageway 406 of cylindrical portion 404 of actuator cam 394 when actuator cam 394 is positioned on lower wall 368 of outer bracket 224. Passageway 406 is a generally L-shaped passageway with first and second semi-circular portions 406a and 406b which define first and second locations or positions for pin 358, which also correspond to day and night viewing positions of outer bracket 352 and, therefore, case 212. Referring to FIGS. 14M and 14N, actuator cam member 394 also includes a mounting structure 426, for example a pin, for a spring 428, preferably a coil spring which is mounted on one end 428 to pin 426 and on second end 428b to pin 398. Pin 398 optionally includes a groove 398a (FIG. 14A) to provide a seat for end 428b of spring 428. In a similar fashion, engagement structure or pin 426 of actuator cam member 394 may include a similar groove to seat second end 428a of spring 428 on actuator cam member 394. Spring 428 provides a resistance for the rotational movement of actuator cam member 394 in opening 392 and, furthermore, applies a biasing force to actuator cam 394 to frictionally engage inner surface 392a of semi-circular offset portion 390 to provide a smooth action for the actuator. In addition, spring 428 urges cam member against downwardly projecting member 358, thus reducing and limiting the relative lateral movement between outer bracket 340 and projecting member 358. When combined with the lateral support provided by inner bracket 342 to outer bracket 340, actuator assembly 224 exhibits reduced play between case 212 and support arm 228 thus improving the vibration characteristics of mirror assembly 210. Again referring to FIGS. 14M and 14N, when knob 410 is positioned as shown in FIG. 14M, actuator cam 394 is rotated in opening 392 clockwise to a first position in which side wall 404c of cylindrical portion 404 bears against side 430a of wedge-shaped stop 430, thus positioning cam member 394 and, therefore, outer bracket 340 in a day viewing position in which inner bracket 342 is generally vertically oriented within opening 372 of outer bracket 340. In preferred form, outer bracket 340 includes a pair of stops 440 which limit movement of outer bracket 340 with respect to inner bracket 342. As best seen in FIG. 14N, when knob 410 is rotated to a counter clockwise position (shown in phantom), actuator cam member 394 is likewise rotated counter clockwise such that pin 358 of inner bracket 342 is located in a second position 406b in actuator cam 394, which pivots outer bracket 340 about pivot axis 352a to a night time viewing position for case 12. In addition, side wall 404d of portion 404 bears against side 430b of stop 430. As knob 410 rotates about its axis of rotation 410a, spring 428 is extended, thus provided resistance to the rotation of knob 410. When 410 is rotated ninety degrees to its night time viewing position, spring 428 returns to its first extended length.

In preferred form, actuator inner bracket 342 and outer bracket 340 comprise a resinous polymeric or plastic material and, more preferably, from a mineral filled polypropylene, such as glass or mineral filled nylon, similar to bracket 24. Actuator cam member 394 preferably comprises a low friction polymeric material and, most preferably, an acetal material, for example TICONA SELCON M90, which is a low friction material and, thus, provides a smooth movement for actuator handle 408.

Thus, a prismatic mirror assembly is provided that is assembled from a plurality of common components that may alternately be used to form the electro-optic mirror assembly of the first embodiment and, further, which provide a compact carrier for backlighting a display on the reflective element and supporting a plurality of electrical and electronic components. In addition, the prismatic mirror assembly includes an actuator which provides a smooth position changer and includes a more stable arrangement which is easy to assemble and, more over, which improves the vibration characteristics of the mirror assembly.

The rearview mirror assemblies of the present invention can include a wide variety of electrical and electronic devices incorporated therein and further utility functions, such as described in copending application entitled REARVIEW MIRROR ASSEMBLY WITH UTILITY FUNCTIONS, filed Nov. 24, 1999, by Barry W. Hutzel, Niall R. Lynam, and Darryl P. DeWind, Attorney Docket DON01 P-778, which is herein incorporated by reference herein in its entirety. For example, rearview mirror assemblies may include: antennas, including GPS or cellular phone antennas, such as disclosed in U.S. Pat. No. 5,971, 552; a communication module, such as disclosed in U.S. Pat. No. 5,798,688; displays such as shown in U.S. Pat. No. 5,530,240 or in U.S. pending application Ser. No. 09/244, 726, filed Feb. 5, 1999; now U.S. Pat. No. 6,172,613; blind spot detection systems, such as disclosed in U.S. Pat. Nos. 5,929,786 or 5,786,772; transmitters and/or receivers, such as garage door openers, a digital network, such as described in U.S. Pat. No. 5,798,575; a high/low head lamp controller, such as disclosed in U.S. Pat. No. 5,715,093; a memory mirror system, such as disclosed in U.S. Pat. No. 5,796,176; a hands-free phone attachment, a video device for internal cabin surveillance and/or video telephone function, such as disclosed in U.S. Pat. Nos. 5,760,962 and 5,877,897 and copending application Ser. No. 09/433,467; a remote keyless entry receiver; map lights, such as disclosed in U.S. Pat. Nos. 5,938,321; 5,813,745; 5,820,245; 5,673,994; 5,649,756; or 5,178,448; microphones and/or speakers, such as disclosed in U.S. patent applications Ser. No. 09/361,814, filed Jul. 27, 1999, and now U.S. Pat. No. 6,201,642 09/199,907, filed Nov. 25, 1998; a compass, such as disclosed in U.S. Pat. No. 5,924,212; seat occupancy detector; a trip computer; an ONSTAR System or the like, with all of the referenced patents and applications being commonly assigned to Donnelly Corporation, the disclosures of which are herein incorporated by reference in their entireties. Other features which can be incorporated include: a baby minder system, such as the vehicle interior monitoring system described in U.S. Pat. Nos. 5,877,897 and 5,760,962 or the rear vision system described in pending U.S. patent applications Ser. No. 09/361,814 filed Jul. 27, 1999 now U.S. Pat. No. 6,201,642, and Ser. No. 09/199,907 filed Nov. 25, 1998. and U.S. patent application Ser. No. 09/422,467 (Attorney Docket No. P-783) filed Nov. 4, 1999 titled "Vehicle Interior Mirror Assembly" to Patrick Heslin and Niall R. Lynam, all of which are incorporated by reference in their entireties herein.

For example, a camera, such as a CMOS or CCD camera, can be mounted to view the rear seat area of the vehicle so that the driver can view what is occurring, such as in a rear seat mounted baby seat or with a rear seat passenger such as children. Preferably, to enable viewing of the rear seat occupant or occupants even by night, the target field of view of the camera may be illuminated in a manner that provides adequate visibility for the camera to discern what is occurring in the rear seat in a darkened vehicle cabin but not illuminating in a manner that causes glare, distraction, and/or discomfort to any vehicle occupants, including the driver and/or rear seat passengers. For example, such a rear seat monitoring camera illumination is preferably achieved using directed low level non-incandescent light sources, such as light emitting diodes (LEDs), organic light emitting material, electroluminescent sources, and the like, and most preferably such non-incandescent sources are low power and are directed low intensity sources, such as described in U.S. Pat. No. 5,938,321 and copending application entitled "INTERIOR MIRROR ASSEMBLY FOR A VEHICLE INCORPORATING A SOLID-STATE LIGHT SOURCE", Ser. No. 09/287,926, filed Apr. 7, 1999, now U.S. Pat. No. 6,139,172, which are incorporated herein by reference in their entireties. A baby minder camera may be mounted as a part of the rearview mirror assembly and, most preferably, may be mounted as a part of a header, including a front header of a roof or a rear header of a roof. It may be desirable to mount a baby minder camera it to the rear header of a roof when it is desirable to view rear facing child support seats. Most preferably, a plurality of at least two, more preferably at least four, and most preferably at least six LEDs are mounted with a camera (such as to form a ring around the camera) with the light projected from the individual LEDs directed to be coincident with the camera field of view and to illuminate the target area desired to be viewed. The LEDs being directed low level sources will not glare or cause discomfort to occupants when illuminated. Further, non-incandescent camera illumination sources can be illuminated whenever the ignition switch is on to operate the vehicle or at least when the ignition switch is placed in "an accessory on" position so that both the camera and illumination lights are operating on vehicle battery power even when parked. Alternately, the illumination lights can be operational only when the baby minder camera is selected to be operational. While it is preferred to use non-incandescent lights, such incandescent light sources can be used, most preferably high intensity, low current incandescent light sources. An interior surveillance system permits the driver of the vehicle to observe behavior or the activities of babies or children or other passengers seated in the rear seat. This is especially advantageous when the child or baby is in a rearward facing car seat, where the child or baby would ordinarily not be visible. For example, a camera, such as a CMOS or CCD camera, can be mounted to view the rear seat area of the vehicle so that the driver can view what is occurring, such as in a rear seat mounted baby seat or with a rear seat passenger such as children. Preferably, to enable viewing of the rear seat occupant or occupants even by night, the target field of view of the camera may be illuminated in a manner that provides adequate visibility for the camera to discern what is occurring in the rear seat in a darkened vehicle cabin but not illuminating in a manner that causes glare, distraction, and/or discomfort to any vehicle occupants, including the driver and/or rear seat passengers.

Furthermore, the mirror assemblies of the present invention may incorporate a navigation system, such as described in as described in copending provisional application Ser. No. 60/131,593, filed Apr. 29, 1999, entitled VEHICLE-BASED NAVIGATION SYSTEM WITH SMART MAP FILTERING, PORTABLE UNIT HOME-BASE REGISTRATION AND MULTIPLE NAVIGATION SYSTEM PREFERENTIAL USE, which is herein incorporated by reference in its entirety. Alternately or in addition, the modular aspects of the present invention can be combined with or incorporate a wide variety of other interior rearview mirror assemblies including electrically operated compass mirrors such as disclosed in U.S. Pat. No. 5,253,109; electrically operated interior rearview mirrors incorporating map reading lights such as disclosed in U.S. Pat. Nos. 4,646,210; 4,733,336; 4,807,096; and 5,178,448; and electrically operated automatically dimming mirrors such as described in U.S. Pat. Nos. 4,793,690; 4,799,768; 4,886,960; and 5,193,029; mirror assemblies incorporating GPS such as disclosed in patent application Ser. No. 08/569,851, filed Dec. 8, 1995, by Roger L. Veldman and Desmond O'Farrell for "A VEHICLE GLOBAL POSITIONING SYSTEM NAVIGATIONAL AID"; mirrors including head light controls, such as disclosed in U.S. patent application Ser. No. 08/621,863, filed Mar. 25, 1996, now U.S. Pat. No 5,796,094, entitled "VEHICLE HEADLIGHT CONTROL USING IMAGING SENSOR"; mirrors incorporating displays, such as disclosed in U.S. patent application Ser. No. 09/244,726, filed Feb. 5, 1999, entitled "REARVIEW MIRROR ASSEMBLY INCORPORATING VEHICLE INFORMATION DISPLAY" now U.S. Pat. No. 6,172,613, and U.S. Pat. No. 5,530,240 for "DISPLAY FOR AUTOMATIC REARVIEW MIRROR"; mirrors incorporating blind spot detection systems, such as disclosed in U.S. Pat. No. 5,530,240; U.S. Pat. No. 5,576,687; and U.S. patent application Ser. No. 08/799,734, entitled "VEHICLE BLIND SPOT DETECTION AND DISPLAY SYSTEM", filed Feb. 12, 1997, now U.S. Pat. No. 5,786,772, and mirrors incorporating remote transaction systems, such as disclosed in U.S. patent application Ser. No. 09/057,428, filed Apr. 8, 1998, for "A VEHICLE MOUNTED REMOTE TRANSACTION INTERFACE SYSTEM", now U.S. Pat. No. 6,158,655, and U.S. Pat. No. 5,798,575; all commonly assigned to Donnelly Corporation, Holland Mich. and the disclosures of which are herein incorporated by reference in their entireties.

It can be appreciated from the foregoing that the present invention provides a modular design in which a plurality of common components may be assembled to form either a prismatic mirror assembly or an electro-optic interior mirror assembly. For example, both the bracket and actuator bracket of the electrochromic and prismatic mirror assemblies are staked into the respective casing using identical mounting posts and tabs. The attachment member of both assemblies use common components and combines similar features in similar locations thus simplifying the assembly process of the respective attachment member. In addition, the attachment member provides light assemblies which have an appropriate setback to provide adequate spacing between the display module and the light sources so that the light is defused enough to create uniform light across the display. Furthermore, the light module is adapted to substantially reduce and preferably eliminate light leakage between the chambers of the respective light assemblies and, therefore, only illuminate the selected indicia. Since the attachment member of the respective mirror assemblies comprises a fully assembled electronic electrical device carrier or cartridge, the assembly process of the mirror assemblies is greatly simplified. To further simplify the assembly process, the attachment member is configured such that the attachment member can be inserted into the respective casing in one orientation only. Additionally, since the ribs and extensive webbing in the conventional electrochromic mirror casings are eliminated, the casing of the electrochromic assembly has now even more room for other electrical or electronic devices within casing 12. Moreover, the present design allows for greater flexibility, for example if a ball end version is desired, a respective bracket may be staked with a socket as opposed to the ball mount. Moreover, the actuator bracket of the prismatic mirror assembly provides a more stable mounting for the mirror case. Further, the attachment member provides impact absorbing characteristics and significantly reduces the risk of the reflective element shattering and more preferably breaking in the event of an impact.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

The embodiments of the invention in which an exclusive property or privilege we claim are as follows:

1. An interior rearview mirror assembly for vehicles, said mirror assembly comprising:
   a mirror case having a reflective element, said mirror case being adapted to mount to a vehicle, said reflective element including a substrate, a reflective coating on one side of said substrate and a window therethrough; and
   a carrier positioned in said case, said carrier having a display element for displaying one or more indicia through said window to define a display area on said reflective element.

2. The interior rearview mirror assembly according to claim 1, wherein said window is defined by a reflective coating free area on said substrate.

3. The interior rearview mirror assembly according to claim 1, wherein said case further includes at least one of an electronic device and an electrical device being supported by said carrier.

4. The interior rearview mirror assembly according to claim 3, wherein said device is mounted on a circuit board, said circuit board being supported by said carrier.

5. The interior rearview mirror assembly according to claim 1, wherein said case includes a bezel.

6. The interior rearview mirror assembly according to claim 5, wherein said rearview mirror assembly further includes a user actuatable interface having at least one user actuatable button, said button being located along said bezel.

7. The interior rearview mirror assembly according to claim 6, wherein said carrier supports at least one switch for actuating a vehicle function, said carrier positioning said switch behind said button for actuation by said button.

8. The interior rearview mirror assembly according to claim 6, wherein said user actuatable button comprises a resilient material.

9. The interior rearview mirror assembly according to claim 8, wherein said resilient material comprises a silicone material.

10. The interior rearview mirror assembly according to claim 6, wherein said actuatable interface includes a plurality of buttons.

11. The interior rearview mirror assembly according to claim 7, wherein said switch is supported on a switch board, said switch board being supported by said carrier.

12. The interior rearview mirror assembly according to claim 1, wherein said carrier comprises a plate member, said plate member having a first portion and a second portion offset rearwardly from said reflective element from said first portion, and said second portion including said display element.

13. The interior rearview mirror assembly according to claim 1, further comprising at least one light assembly for displaying said indicia visible through said window.

14. The interior rearview mirror assembly according to claim 1, wherein said carrier supports a plurality of light assemblies for illuminating indicia on said display element visible through said window, each of said light assemblies being isolated from adjacent light assemblies wherein light leakage between the respective light assemblies is substantially reduced.

15. The interior rearview mirror assembly according to claim 14, wherein said carrier includes a divider wall between each light assembly.

16. The interior rearview mirror assembly according to claim 14, wherein said carrier includes a body with a plurality of cavities formed therein, a plurality of light sources associated with said cavities, and said display element extending over said body and over said cavities, said cavities together with said light sources forming said light assemblies and directing light from said light sources to said display element displaying said indicia.

17. The interior rearview mirror assembly according to claim 16, wherein each of said cavities includes at least one opening formed therein through which said light sources direct light to said display element, each of said openings having a reflecting surface associated therewith for diffusing the light from a respective light source associated therewith.

18. The interior rearview mirror assembly according to claim 17, wherein said reflecting surfaces comprise curved reflecting surfaces.

19. The interior rearview mirror assembly according to claim 16, wherein said light sources comprise non-incandescent light sources.

20. The interior rearview mirror assembly according to claim 16, wherein said display element comprises a resinous polymeric plate member.

21. The interior rearview mirror assembly according to claim 16, wherein said window comprises a trapezoidal-shaped window.

22. The interior rearview mirror assembly according to claim 21, wherein said display element comprises a trapezoidal-shaped member.

23. The interior rearview mirror assembly according to claim 16, further comprising a frame mounted to said display element, said frame mounting said display element on to said carrier over said body and said cavities.

24. The interior rearview mirror assembly according to claim 23, wherein said frame includes a base wall mounted to said display element, said base wall including a plurality of openings corresponding to and aligning with said cavities of said body, said openings exposing areas of said display element, and said light assembly directing light to said areas of said display element for displaying said indicia.

25. The interior rearview mirror assembly according to claim 24, wherein said frame includes recessed landing surfaces extending around each of said openings, said body including projecting perimeter walls around each of said cavities, said perimeter walls seating on said landing surfaces to isolate each cavity and each of said areas of said display element to substantially reduce light leakage between the respective light assemblies.

26. The interior rearview mirror assembly according to claim 16, said display element abutting said first surface of said reflective element and aligned with said window.

27. The interior rearview mirror assembly according to claim 17, wherein said light sources are mounted on a circuit board, said circuit board being supported by said carrier, and said light sources being aligned with respective openings of said cavities.

28. The interior rearview mirror assembly according to claim 1, wherein said carrier comprises a resinous polymeric member.

29. The interior rearview mirror assembly according to claim 1, wherein said case includes a bottom wall and at least one light assembly positioned in said bottom wall of said case, and said carrier supporting a light source for said light assembly.

30. The interior rearview mirror assembly according to claim 1, wherein said case includes a bottom wall, said bottom wall supporting a microphone module.

31. The interior rearview mirror assembly according to claim 1, further comprising a circuit board mounted to said carrier, said circuit board supporting at least one of an electronic device and an electrical device.

32. The interior rearview mirror assembly according to claim 1, wherein said reflective element comprises a prismatic reflective element.

33. The interior rearview mirror assembly according to claim 32, further comprising an actuator, said actuator moving said reflective element between a day viewing orientation and a night viewing orientation with reduced reflectivity.

34. The interior rearview mirror assembly according to claim 1, wherein said reflective element comprises an electro-optic reflective element.

35. The interior rearview mirror assembly according to claim 34, wherein said reflective element comprises an electrochromic reflective element.

36. A interior rearview mirror assembly for vehicles, said mirror assembly comprising:
a mirror case having a reflective element, said mirror case being adapted to mount to a vehicle, said reflective element including a substrate and a reflective coating on one side of said substrate, said reflective element further including a window through said reflective coating on said substrate; and
a carrier located in said case, said carrier having a display module for displaying one or more indicia through said window to define a display area on said reflective element, and said carrier supporting at least one of an electronic and electrical device.

37. The interior rearview mirror assembly according to claim 36, wherein said at least one electronic and electrical device is mounted on a circuit board, said circuit board being supported by said carrier.

38. The interior rearview mirror assembly according to claim 36, wherein said carrier comprises a plate member, said plate member having a first portion and a second portion offset rearwardly from said reflective element from said first portion, and said second portion including said light module.

39. The interior rearview mirror assembly according to claim 38, wherein said light module includes a plurality of light assemblies, each of said light assemblies being isolated from adjacent light assemblies whereby light leakage is substantially reduced between the respective light assemblies.

40. The interior rearview mirror assembly according to claim 39, wherein said light module includes a divider wall between each light assembly.

41. The interior rearview mirror assembly according to claim 40, wherein said light module includes a body with a plurality of cavities formed therein, a plurality of light sources associated with said cavities, and a display element extending over said body and over said cavities, said cavities directing light from said light sources to said display element for displaying said indicia.

42. The interior rearview mirror assembly according to claim 41, wherein said cavities include reflecting surfaces associated with each light source for diffusing the light from said light sources.

43. The interior rearview mirror assembly according to claim 42, wherein said reflecting surfaces comprise curved reflecting surfaces.

44. The interior rearview mirror assembly according to claim 42, wherein said light sources comprise non-incandescent light sources.

45. The interior rearview mirror assembly according to claim 42, wherein said display element comprises a plastic element.

46. The interior rearview mirror assembly according to claim 42, further comprising a frame mounted to said display element, said frame mounting said display element on to said carrier over said body and said cavities.

47. The interior rearview mirror assembly according to claim 46, said display element abutting said first surface of said reflective element and aligned with said window.

48. The interior rearview mirror assembly according to claim 36, wherein said case includes a bottom wall and at least one of a light assembly and a microphone module supported at said bottom wall.

49. The modular interior rearview mirror assembly according to claim 36, wherein said reflective element comprises a prismatic reflective element.

50. The modular interior rearview mirror assembly according to claim 36, wherein said reflective element comprises an electro-optic reflective element.

51. The modular interior rearview mirror assembly according to claim 36, wherein said case includes a bezel.

52. The modular interior rearview mirror assembly according to claim 51, further comprising a riser actuator interface having at least one user actuatable button.

53. The interior rearview mirror assembly according to claim 52, wherein said carrier supports at least one switch, said carrier positioning said switch behind said button for actuation by said button.

54. A interior rearview mirror assembly for vehicles, said mirror assembly comprising:

a mirror case having a prismatic reflective element; and an actuator assembly for shifting the reflective element between a day viewing position and a night viewing position having a reduced reflectivity, said actuator assembly having a first member and a second member, said first member being adapted to mount said mirror case to a vehicle and having first and second portions, a second member being mounted to said mirror case and being pivotally mounted to said first portion of said first member and coupled to said second portion of said first member whereby pivoting of said second member about said first portion shifts said mirror case between said day viewing position and said night viewing position.

55. The interior rearview mirror assembly according to claim 54, wherein said second member is biased against said second portion of said first member.

56. The interior rearview mirror assembly according to claim 55, wherein said second member is biased against said second portion by a spring.

57. The interior rearview mirror assembly according to claim 56, wherein said spring comprises a coil spring and includes one end mounted to said first member and a second end mounted to said second member.

58. The interior rearview mirror assembly according to claim 54, wherein said actuator assembly further includes an actuator handle, said actuator handle being supported by said second member, said actuator handle rotating about an axis of rotation between a day position and a night position, rotation of said actuator handle about said axis of rotation induces pivoting of said case about a pivot axis, and said axis of rotation being generally orthogonal to said pivot axis.

59. The interior rearview mirror assembly according to claim 58, wherein said first member includes a downwardly depending member and said rotation of said actuator handle moves said second member with respect to said downwardly depending member to thereby pivot said case about said pivot axis.

60. The interior rearview mirror assembly according to claim 58, said actuator assembly further includes a cam member, said actuator handle rotating said cam member about said axis of rotation, said cam member moving said second member with respect to said first member to thereby pivot said case between said day viewing position and said night viewing position.

61. The interior rearview mirror assembly according to claim 60, wherein said cam member includes a transverse opening defining a guide path, said downwardly depending member extending into said transverse opening, said guide path having a first end and a second end, when said actuator handle pivots to said day position said cam member pivots to position said downwardly depending member at said first end, and when said actuator handle pivots to said night position said cam member pivots to position said downwardly depending member at said second end.

62. The interior rearview mirror assembly according to claim 55, wherein said second member includes a central opening, said first member positioned in said central opening.

63. The interior rearview mirror assembly according to claim 55, wherein said mirror case includes a back wall, said second member being rigidly mounted to said back wall.

64. The interior rearview mirror assembly according to claim 63, wherein said mirror case includes a plurality of projecting bosses on said back wall, said second member being mounted to said mounting bosses on said back wall.

65. A interior rearview mirror assembly for vehicles, said mirror assembly comprising:

a mirror case having a prismatic reflective element; and an actuator assembly for shifting the reflective element between a day viewing position and a night viewing position having a reduced reflectivity, said actuator assembly having a first member and a second member, said first member being adapted to mount said mirror case to a vehicle, a second member being mounted to said mirror case and being pivotally mounted to said first member about a pivot axis, said first member having at least a portion thereof positioned within said second member to limit lateral movement of said second member to increase the stability of said mirror case on said first member, and whereby pivoting of said second member about said first member shifts said mirror case between said day viewing position and said night viewing position.

66. The interior rearview mirror assembly according to claim 65, wherein said second member is biased against said first member in a direction generally orthogonal to said pivot axis when said mirror case shifted to one of said day viewing position and said night viewing position.

67. The interior rearview mirror assembly according to claim 66, wherein said second member is biased against said first member by a spring.

68. The interior rearview mirror assembly according to claim 66, wherein said actuator assembly further includes an actuator handle, said actuator handle being supported by said second member, said actuator handle rotating about an axis of rotation between a day position and a night position, rotation of said actuator handle about said axis of rotation induces pivoting of said case about said pivot axis, and said axis of rotation being generally orthogonal to said pivot axis.

69. The interior rearview mirror assembly according to claim 68, wherein said first member includes a downwardly depending member and said rotation of said actuator handle guides said second member with respect to said downwardly depending member to thereby pivot said case about said pivot axis.

70. The interior rearview mirror assembly according to claim 68, wherein said actuator assembly further includes a cam member, said actuator handle rotating said cam member about said axis of rotation, said cam member moving said second member with respect to said first member to thereby pivot said case between said day viewing position and said night viewing position.

71. The interior rearview mirror assembly according to claim 65, wherein said second member includes a central opening, said first member positioned in said central opening.

72. The interior rearview mirror assembly according to claim 65, wherein said mirror case includes a back wall, said second member being rigidly mounted to said back wall.

73. The interior rearview mirror assembly according to claim 72, wherein said mirror case includes a plurality of projecting members on said back wall, said second member being mounted to said mounting members on said back wall.

* * * * *

UNITED STATES PATENT AND TRADEMARK OFFICE
CERTIFICATE OF CORRECTION

PATENT NO.         : 6,329,925 B1
APPLICATION NO. : 09/448700
DATED              : December 11, 2001
INVENTOR(S)       : Timothy G. Skiver et al.

Page 1 of 1

It is certified that error appears in the above-identified patent and that said Letters Patent is hereby corrected as shown below:

Column 4:
Line 10, Insert --a-- after "is".
Line 17, "minor" should be --mirror--.
Line 58, Insert --of-- after "assembly".

Column 5:
Line 2, "13" should be --13A;--.

Column 18:
Line 65, Delete "." after "system".

Column 25:
Line 11, Delete "and" before "now".

Signed and Sealed this

Twenty-fourth Day of February, 2009

JOHN DOLL
*Acting Director of the United States Patent and Trademark Office*